United States Patent
Lee et al.

(10) Patent No.: US 7,911,899 B2
(45) Date of Patent: Mar. 22, 2011

(54) OPTICAL DISC REPRODUCING APPARATUS USING AN ASYMMETRIC COMPENSATION SCHEME

(75) Inventors: Jung Hyun Lee, Seoul (KR); Eun Jin Ryu, Suwon-si (KR); Eing Seob Cho, Yongin-si (KR); Jun Jin Kong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1051 days.

(21) Appl. No.: 11/713,668

(22) Filed: Mar. 5, 2007

(65) Prior Publication Data

US 2007/0206476 A1 Sep. 6, 2007

(30) Foreign Application Priority Data

Mar. 3, 2006 (KR) .................. 10-2006-0020667

(51) Int. Cl.
*G11B 15/52* (2006.01)

(52) U.S. Cl. ............... 369/47.17; 369/47.35; 369/53.33
(58) Field of Classification Search .................. None
See application file for complete search history.

(56) References Cited

U.S. PATENT DOCUMENTS

| | | | |
|---|---|---|---|
| 2005/0058048 A1* | 3/2005 | Park et al. | 369/59.17 |
| 2005/0083822 A1* | 4/2005 | Park et al. | 369/59.27 |
| 2005/0128916 A1* | 6/2005 | Park et al. | 369/59.21 |
| 2005/0128918 A1* | 6/2005 | Park et al. | 369/60.01 |

* cited by examiner

*Primary Examiner* — Paul Huber
(74) *Attorney, Agent, or Firm* — Sughrue Mion, PLLC

(57) ABSTRACT

An optical disc reproducing apparatus includes an analog-to-digital (A/D) converter which converts an analog signal obtained from an optical disc to a digital signal; an asymmetry compensator which detects and corrects an offset of the digital signal; a phase locked loop (PLL) which estimates a clock of the digital signal and compensates for a frequency error; a binary module which converts the digital signal to binary data; an equalizer which equalizes a particular frequency of the digital signal; and a channel identifier which detects a reference level of the binary module, based on an input signal of the equalizer.

31 Claims, 23 Drawing Sheets

FIG. 6

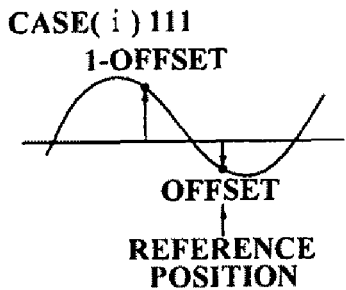

CASE( i ) 111

1-OFFSET

OFFSET

REFERENCE POSITION

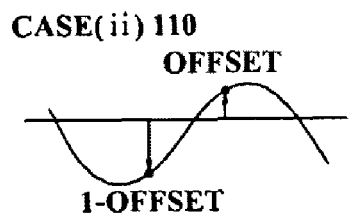

CASE( ii ) 110

OFFSET

1-OFFSET

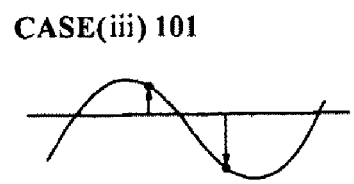

CASE(iii) 101

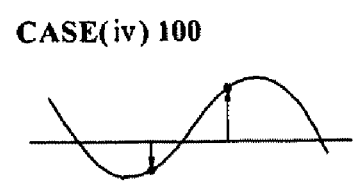

CASE(iv) 100

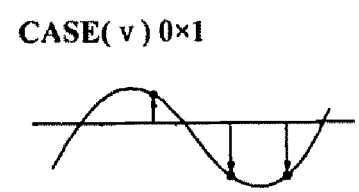

CASE( v ) 0×1

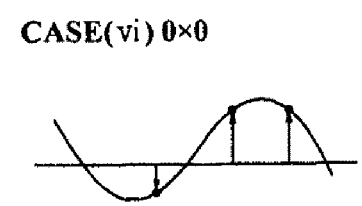

CASE(vi) 0×0

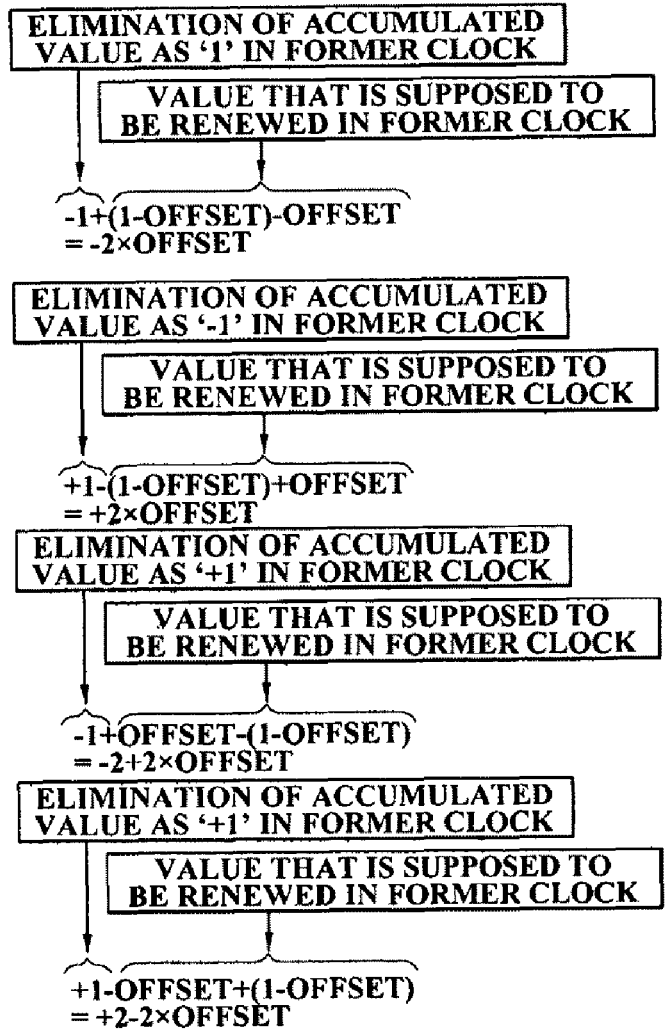

ELIMINATION OF ACCUMULATED VALUE AS '1' IN FORMER CLOCK

VALUE THAT IS SUPPOSED TO BE RENEWED IN FORMER CLOCK $-1+(1-OFFSET)-OFFSET$
$= -2 \times OFFSET$

ELIMINATION OF ACCUMULATED VALUE AS '-1' IN FORMER CLOCK

VALUE THAT IS SUPPOSED TO BE RENEWED IN FORMER CLOCK $+1-(1-OFFSET)+OFFSET$
$= +2 \times OFFSET$

ELIMINATION OF ACCUMULATED VALUE AS '+1' IN FORMER CLOCK

VALUE THAT IS SUPPOSED TO BE RENEWED IN FORMER CLOCK $-1+OFFSET-(1-OFFSET)$
$= -2+2 \times OFFSET$

ELIMINATION OF ACCUMULATED VALUE AS '+1' IN FORMER CLOCK

VALUE THAT IS SUPPOSED TO BE RENEWED IN FORMER CLOCK $+1-OFFSET+(1-OFFSET)$
$= +2-2 \times OFFSET$

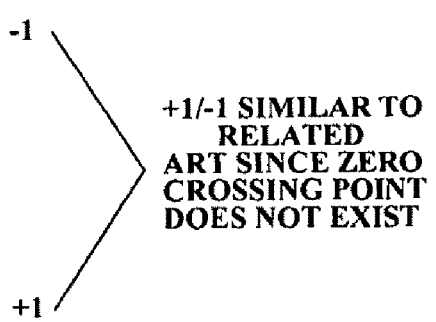

+1/-1 SIMILAR TO RELATED ART SINCE ZERO CROSSING POINT DOES NOT EXIST

FIG. 18

| INDEX | PATTERN T(F) | PATTERN F(T) | |
|---|---|---|---|
| 1 | 001110000 | 001100000 | 1 |
| 2 | 011110000 | 011100000 | 1 |
| 3 | 111110000 | 111100000 | 1 |
| 4 | 001110001 | 001100001 | 1 |
| 5 | 011110001 | 011100001 | 1 |
| ... | ... | ... | ... |
| 19 | 00111001100 | 00110011100 | 2 |
| 20 | 01111001100 | 01110011100 | 2 |
| 21 | 11111001100 | 11110011100 | 2 |
| 22 | 00111001110 | 00110011110 | 2 |
| 23 | 01111001110 | 01110011110 | 2 |
| ... | ... | ... | ... |
| 50 | 1000110011110 | 10000011001110 | 3 |
| 51 | 1100110011110 | 11001011001110 | 3 |
| 52 | 0000110011111 | 00001011001111 | 3 |
| 53 | 1000110011111 | 10001011001111 | 3 |
| 54 | 1100110011111 | 11001011001111 | 3 |

OPTICAL DISC REPRODUCING APPARATUS USING AN ASYMMETRIC COMPENSATION SCHEME

CROSS-REFERENCE TO RELATED APPLICATION

This application claims priority from Korean Patent Application No. 10-2006-0020667, filed on Mar. 3, 2006, in the Korean Intellectual Property Office, the entire disclosure of which is incorporated herein by reference.

BACKGROUND OF THE INVENTION

1. Field of the Invention

Apparatuses consistent with the present invention relate to an optical disc reproducing apparatus, and more particularly, to an optical disc reproducing apparatus supporting various Run Length Limited (RLL) codes such as RLL(2,1), RLL(1, 7) and RLL(1,10), wherein the optical disc reproducing apparatus compensates for minute asymmetrical features of a partial response (PR) (abcde) channel, and a PR signal and supports an accurate detection of data, a jitter measurement and a signal synchronization, and a 16 level 5-tap Viterbi decoder.

2. Description of Related Art

With the multimedia era beginning, needs for storing and transmitting a large quantity of digital data have been increased. Accordingly, an optical disc such as a digital video disc (DVD) has been boomingly studied in the art these days. The current DVD market is steadily growing, being divided into a computer industry that desires to adopt a DVD read only memory (DVD-ROM) and a home appliance industry that intends to promote a DVD-video. Additionally, the DVD extends an applicable sphere accordingly, as a DVD-recordable (DVD-R), a DVD-rewritable (DVD-RW) and a DVD-random access memory (DVD-RAM) appear on the market.

Such kinds of conventional optical discs may be often confronted with problems as follows. When data stored in the optical disc are reproduced, analog radio frequency (RF) signals under reproduction may frequently exhibit an asymmetric waveform. Furthermore, this asymmetric phenomenon may give rise to other unfavorable phenomena such as a jitter, a non-linear bit offset, a direct current (DC) offset, and an inter-symbol interference (ISI) between symbols of reproduced data. Such phenomena often make it difficult to execute a detection and a correction of frequency errors and phase errors, thus causing the distortion of reproduced signals. A related art optical disc reproducing apparatus has typically used a digital sum value (DSV) algorithm to correct such asymmetric errors.

However, the related art DSV algorithm does not always execute an exact correction of the asymmetric errors under various code environments such as RLL(1,10) and RLL(2, 10). For example, the related art DSV algorithm may often fail to exactly detect asymmetric errors in the case of 4T sampling signals reproduced in the variable frequency oscillator (VFO) sector of the optical disc.

Furthermore, the related art optical disc reproducing apparatus does not support an integrated solution for both RLL(1, 10) and RLL(2,10) codes. Therefore, two separate and independent code detectors, namely, adding an RLL(1,10) detector to an existing RLL(2,10) detector, are used to support the integrated solution. This configuration of the detectors may, however, be inefficient in circuit area use and power consumption.

Also, according to the related art optical disc reproducing apparatus, as a signal of a high frequency is amplified, a signal interference phenomenon occurs. Accordingly, the signal may not be identified. Also, accurately measuring a signal quality and estimating a frequency may not be easily executed.

Also, according to the related art optical disc reproducing apparatus, when a feature of the signal is deteriorated, accurate signal models of both an equalizer and a Viterbi decoder may not be set up. Accordingly, a signal detecting operation may not be accurately executed.

Also, according to the related art optical disc reproducing apparatus, a related art DSV algorithm does not detect and compensate a minute DC offset information in a record reproducing channel. Accordingly, frequency and phase errors may not be detected and compensated. Also, a phase locked loop (PPL) operation may be unstably executed.

Also, according to the related art optical disc reproducing apparatus, when the feature of the signal is deteriorated, a frequency estimating operation may not be executed.

Also, according to the related art optical disc reproducing apparatus, the related art optical disc reproducing apparatus may not correspond to various kinds of signal patterns in a high-speed Viterbi detector.

BRIEF SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an optical disc reproducing apparatus which is capable of supporting various Run Length Limited (RLL) codes such as RLL(2,1), RLL(1,7) and RLL(1,10).

The present invention also provides an optical disc reproducing apparatus, which is capable of detecting data more accurately by amplifying a high frequency signal component regardless of an occurrence or an increase of both a noise of a signal and a signal interference, and of measuring a signal quality, and of estimating a frequency.

The present invention also provides an optical disc reproducing apparatus which is capable of adjusting target channel features of both an equalizer and a Viterbi decoder by accurately estimating signal models of both the equalizer and the Viterbi decoder according to each feature of a record reproducing channel.

The present invention also provides an optical disc reproducing apparatus which is capable of accurately compensating for a minute asymmetry feature of the signal in the record reproducing channel.

The present invention also provides an optical disc reproducing apparatus accurately which is capable of estimating a frequency of a synchronous pattern having a symmetric feature.

The present invention also provides an optical disc reproducing apparatus which is capable of supporting various signal patterns including cases in which a minimum T is 2 or 3, and accurately detecting a signal by corresponding to a high-speed signal.

According to an aspect of the present invention, there is provided an optical disc reproducing apparatus, the apparatus including an analog-to-digital (A/D) converter which converts an analog signal obtained from an optical disc to a digital signal; an asymmetry compensator which detects and corrects an offset of the digital signal; a phase locked loop (PLL) which estimates a clock of the digital signal and compensates for a frequency error; a binary module which converts the digital signal to binary data; an equalizer which equalizes a particular frequency of the digital signal; and a channel identifier which detects a reference level of the binary module, based on an input signal of the equalizer.

BRIEF DESCRIPTION OF THE DRAWINGS

The above and other aspects of the present invention will become apparent and more readily appreciated from the following detailed description, taken in conjunction with the accompanying drawings of which:

FIG. 6 is a diagram illustrating a detailed operation principle of a decimal asymmetry detector according to an exemplary embodiment of the present invention;

FIG. 18 is a diagram illustrating a reference table according to an exemplary embodiment of the present invention.

DETAILED DESCRIPTION OF EXEMPLARY EMBODIMENTS OF THE PRESENT INVENTION

Figure 1:
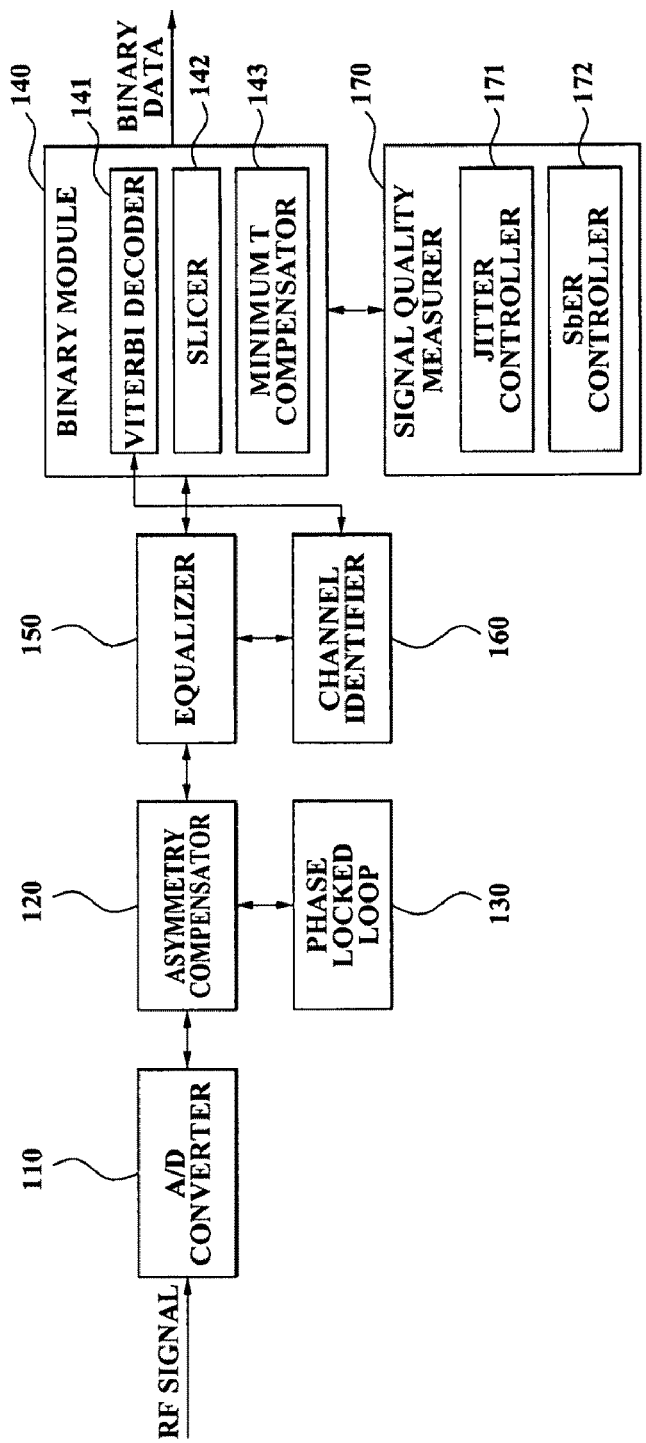
FIG. 1 is a block diagram illustrating an optical disc reproducing apparatus according to an exemplary embodiment of the present invention.

Reference will now be made in detail to certain exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating an optical disc reproducing apparatus according to an exemplary embodiment of the present invention.

The optical disc reproducing apparatus according to an exemplary embodiment of the present invention includes an analog-to-digital (A/D) converter 110, an asymmetry compensator 120, a phase locked loop (PLL) 130, a binary module 140, an equalizer 150, a channel identifier 160, and a signal quality measurer 170. The binary module 140 includes a Viterbi decoder 141, a slicer 142, and a minimum T compensator 143. The signal quality measurer 170 includes a jitter controller 171 and a simulated bit error rate (SbER) controller 172.

The A/D converter 110 is a device that converts an analog radio frequency (RF) signal, extracted from an optical disc, to a digital signal by sampling the analog RF signal in a certain sampling cycle. The sampling cycle may be predetermined.

The asymmetry compensator 120 detects and compensates an offset of the digital signal. An description of a configuration and an operation of the asymmetry compensator 120 will follow with reference to FIG. 2 through FIG. 11.

Figure 2:
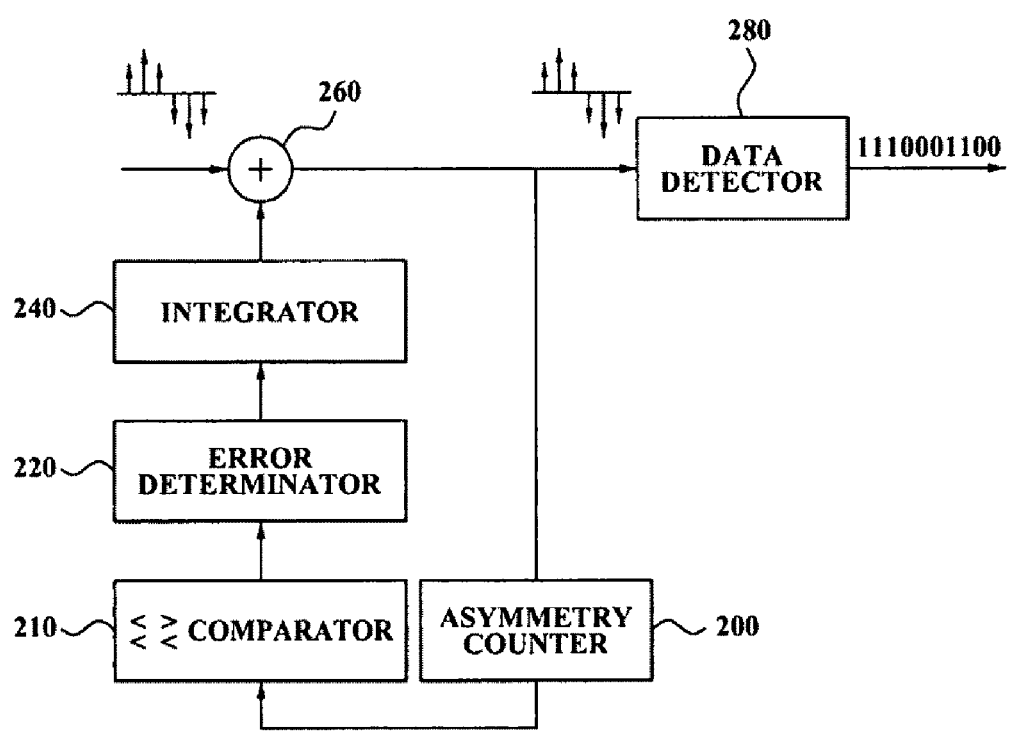
FIG. 2 is a block diagram illustrating an asymmetry signal compensation loop of an asymmetry compensator according to an exemplary embodiment of the present invention.

FIG. 2 is a block diagram illustrating an asymmetry signal compensation loop of an asymmetry compensator according to an exemplary embodiment of the present invention.

The asymmetry compensator according to an exemplary embodiment of the present invention includes the asymmetry counter 200, a comparator 210, an error determinator 220, an integrator 240, a compensator 260, and a data detector 280. A coefficient quantity of the digital signal, which is converted through the A/D converter 110 according to an asymmetry of a signal, is determined through the asymmetry counter 200, and the determined coefficient quantity is accumulated and a final output accumulated coefficient value is generated.

The comparator 210 compares the accumulated coefficient value with a previously stored predetermined threshold. In this instance, the threshold is an optimum value obtained by considering a compensation speed and a steady-state value when estimating. As a result of the comparison, when the accumulated coefficient value is greater than the threshold, the error determinator 220 may convert the accumulated coefficient value to a value for use in a compensation by converting a sign of the accumulated coefficient value to an opposite sign of the accumulated coefficient value.

The integrator 240 accumulates a value that an error is compensated with through the error determinator 220. The compensator 260 converts an input signal to a steady signal, i.e. a signal which compensates for an asymmetry, of a signal level by summing the optimized compensation value and a digital signal input. The data detector 280 detects and outputs the steady signal.

Figure 3:
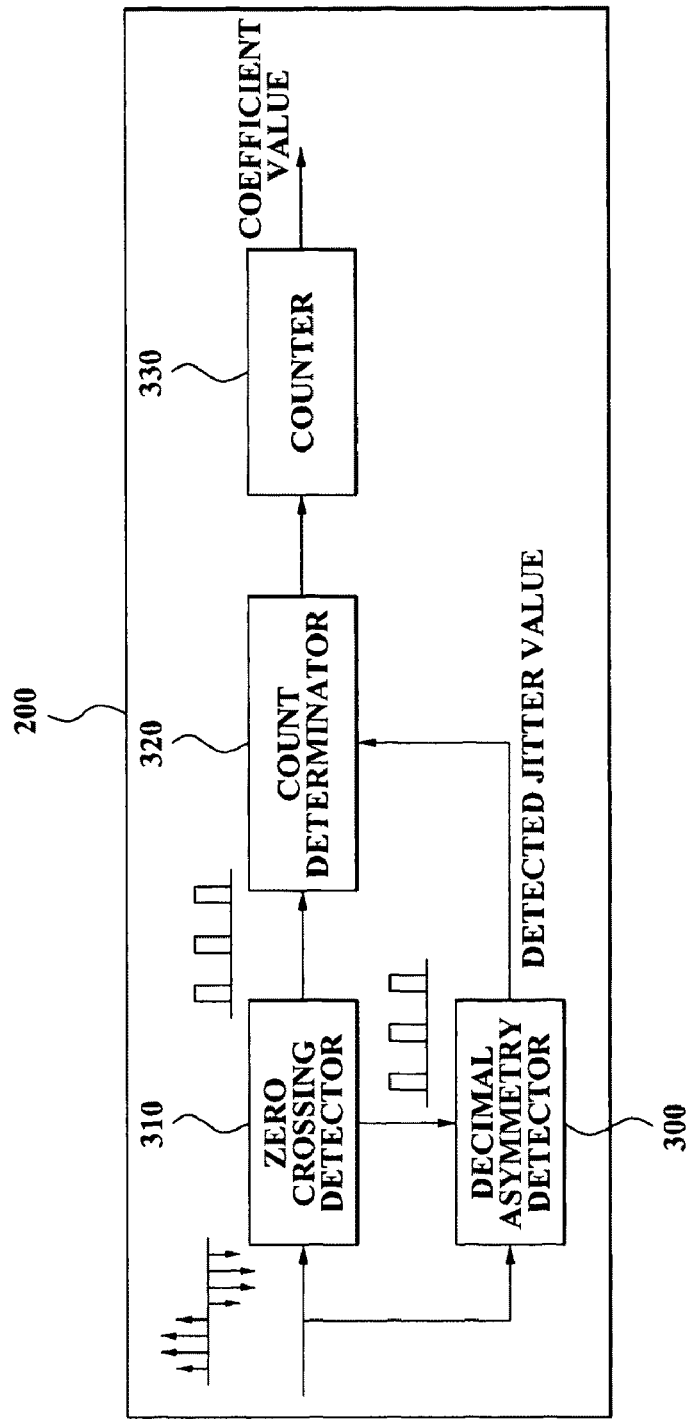
FIG. 3 is a block diagram illustrating an asymmetry counter according to an exemplary embodiment of the present invention.

FIG. 3 is a block diagram illustrating an asymmetry counter according to an exemplary embodiment of the present invention.

The asymmetry counter 200 according to an exemplary embodiment of the present invention includes a decimal asymmetry detector 300, a zero crossing detector 310, a count determinator 320, and a counter 330.

The zero crossing detector 310 detects a zero crossing point in time by using two samples from signals around the zero crossing point, i.e., two samples on either side of the zero crossing point. The decimal asymmetry detector 300 computes an offset to a right of a decimal point at the zero crossing point in time. The count determinator 320 determines a coefficient quantity according to a certain condition, which may be predetermined. The counter 330 accumulates the determined coefficient quantity.

Figure 4:
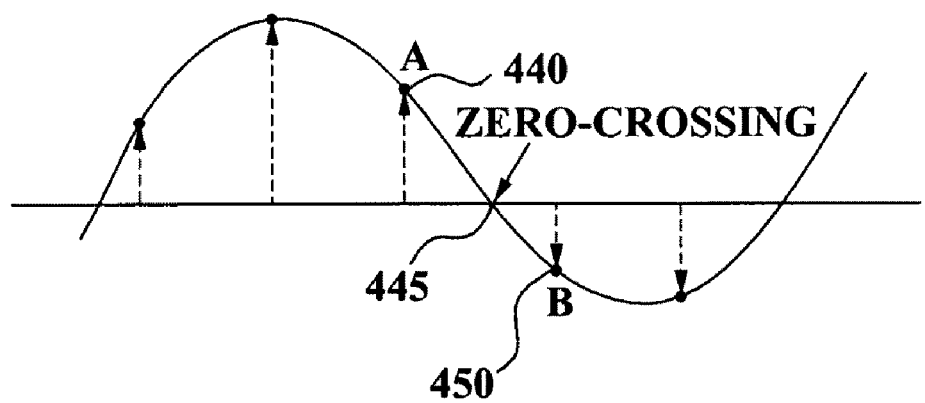
FIG. 4 is a graph illustrating an operation principle of a zero crossing detector according to an exemplary embodiment of the present invention.

FIG. 4 is a graph illustrating an operation principle of a zero crossing detector according to an exemplary embodiment of the present invention.

The graph illustrated in FIG. 4 represents an asymmetry signal. As an example, a sample A 440 and a sample B 450 are selected in order to detect the zero crossing point 445.

Figure 5:
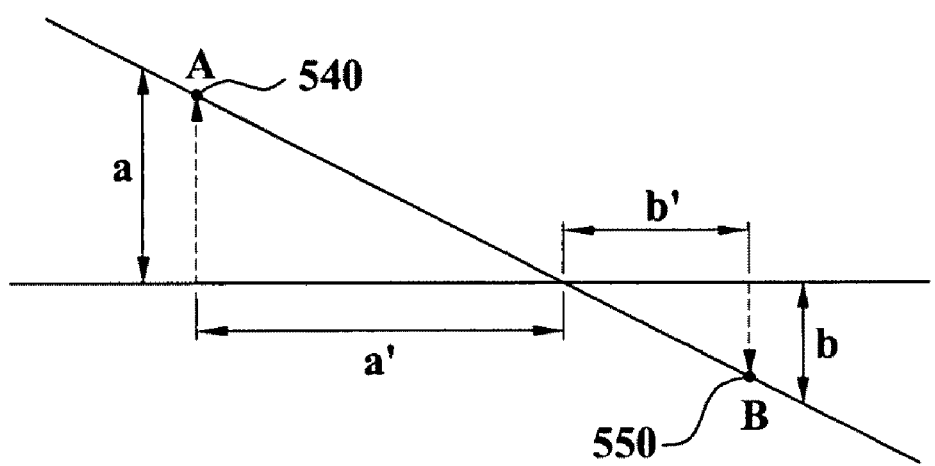
FIG. 5 is a graph illustrating an operation principle of a decimal asymmetry detector according to an exemplary embodiment of the present invention.

FIG. 5 is a graph illustrating an operation principle of a decimal asymmetry detector according to an exemplary embodiment of the present invention.

In order to embody the asymmetry counter 200 when a decimal point is considered, as illustrated in FIG. 5, an assumption may be made that a value of a signal between a sample A 540 and a sample B 550 may be a linear set. According to the assumption, a value of b' may be determined by the following equation utilizing a proportional relationship.

$$a:a'=b:b'$$

$$a'+b'=\text{system clock}$$

$$b'=b*\text{system clock}/(a+b) \quad \text{[Equation 1]}$$

where b' denotes an asymmetry coefficient quantity to a right of a decimal point, which may be a jitter value. The jitter value may be selected as a smallest value between a' and b'. Also, in Equation 1, the jitter value may be defined by defining a as a greatest value among sizes of sample signals around the zero crossing point and b as a smallest value among sizes of sample signals around the zero crossing point.

FIG. 6 is a diagram illustrating a detailed operation principle of a decimal asymmetry detector according to an exemplary embodiment of the present invention.

Hereinafter, an offset denotes an offset to a right of a decimal point. In order to embody the asymmetry counter 200 when the decimal point is considered, a coefficient quantity of the asymmetry counter 200 may be determined by the following three conditions. The following state equation represents three indicators representing a state condition of an asymmetry signal.

$$\text{Case}=(ze\_en, \min\_sel, asym\_out\_d6[5])$$

where ze_en denotes the zero crossing point. When the zero crossing point exists, ze_en may be set as 1. When the zero crossing point does not exist, ze_en may be set as 0.

min_sel denotes a value representing which one between a' and b' is the jitter value. When the jitter value is b', min_sel may be 1. When the jitter value is a', min_sel may be 0.

asym_out_d6[5] denotes a value of maximum sign bit (MSB) of a signal that delays asym_out according to a synchronization in order to determine up/down of the offset. When the MSB is 1, the offset is down. When the MSB is 0, the offset is up.

A case (i) illustrated in FIG. 6 represents the case that the zero crossing point is crossed and b' is determined as the asymmetry coefficient quantity to the right of the decimal point. Accordingly, the state equation may be set as case=(1, 1,1).

A final accumulated value in the case (i) is calculated by, $$-1+(1-\text{offset})-\text{offset}=-2*\text{offset} \quad \text{[Equation 2]}$$

In the case (i), in order to eliminate an accumulated value as +1 in the former clock, −1 is used. When '1−offset' which was supposed to be renewed in the former clock is added and '−offset' in a reference position is added, the final accumulated value in the reference position becomes '−2*offset'.

A case (ii) illustrated in FIG. 6 represents the case that the zero crossing point is crossed and b' is determined as the asymmetry coefficient quantity to the right of the decimal point. Accordingly, the state equation may be set as case=(1, 1,0).

A final accumulated value in the case (ii) is calculated by, $$+1-(1-\text{offset})+\text{offset}=+2*\text{offset} \quad \text{[Equation 3]}$$

The case (ii) is the same as the case (i), but the sign of the signal in the reference position is '+'. Accordingly, as opposed to the case (i), the final accumulated value in the reference position becomes '+2*offset'.

A case (iii) illustrated in FIG. 6 represents the case that the zero crossing point is crossed and b' is determined as the asymmetry coefficient quantity to the right of the decimal point. Accordingly, the state equation may be set as a case=(1,0,1).

A final accumulated value in the case (iii) is calculated by, $$-1+\text{offset}-(1-\text{offset})=-2+2*\text{offset} \quad \text{[Equation 4]}$$

The case (iii) illustrated in FIG. 6 represents the case that the zero crossing point is crossed and b' is determined as the asymmetry coefficient quantity to the right of the decimal point. Accordingly, the state equation may be set as case=(1, 0,0). In the case (iii), in order to eliminate an accumulated value as +1 in the former clock, −1 is used. When 'offset' which was supposed to be renewed in the former clock is added and '−(1−offset)' in the reference position is added, the final accumulated value in the reference position becomes '−2+2*offset'.

A final accumulated value in a case (iv) is calculated by, $$+1-\text{offset}+(1-\text{offset})=+2-2*\text{offset} \quad \text{[Equation 5]}$$

The case (iv) is the same as the case (iii), but the sign of the signal in the reference position is '+'. Accordingly, as opposed to the case (iii), the final accumulated value in the reference position becomes '+2−2*offset'.

In a case v and a case vi, the zero crossing point is not crossed. Accordingly, +1 or −1 is added or subtracted in the same way as a related art digital sum value (DSV) system.

A method which is described in FIG. 3 through FIG. 6 determines the jitter value as the coefficient quantity to the right of the decimal point and reflects the jitter value in the counter. In a following description, a method reflecting a value to the right of the decimal point by applying different coefficient values to the zero crossing point for each section will be described.

Figure 7:
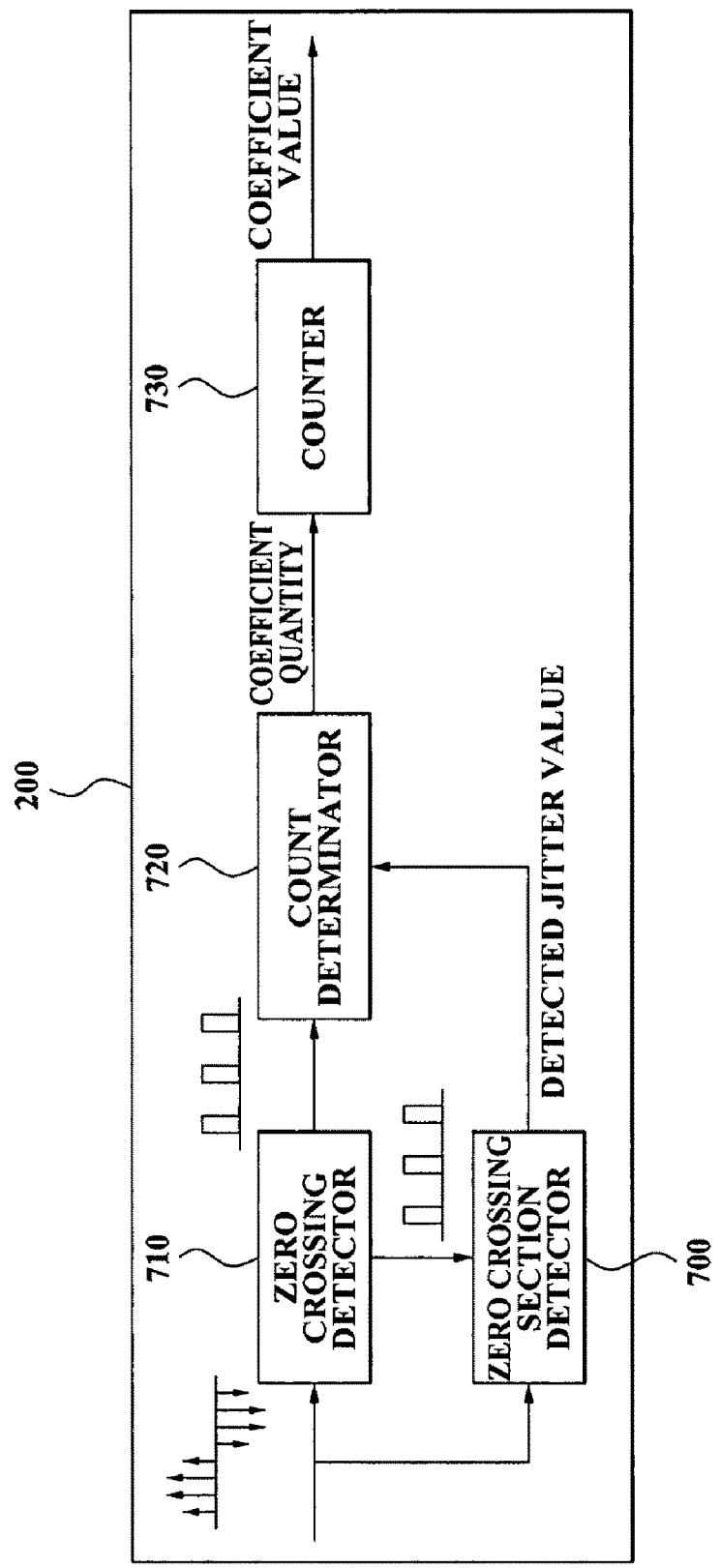
FIG. 7 is a block diagram illustrating an asymmetry counter according to another exemplary embodiment of the present invention.

FIG. 7 is a block diagram illustrating an asymmetry counter according to another exemplary embodiment of the present invention.

The asymmetry counter 200 according to another exemplary embodiment of the present invention includes a zero crossing section detector 700, a zero crossing detector 710, a count determinator 720, and a counter 730.

When a zero crossing point of an input signal occurs, the zero crossing section detector 700 may estimate a section where the zero crossing point exists through a conditional expression operation.

The zero crossing detector 710 detects a zero crossing point in time by using two samples among signals around the zero crossing point. The zero crossing section detector 700 calculates an asymmetry value to a right of a decimal point at the zero crossing point in time.

The count determinator 720 determines a coefficient quantity according to a certain condition, which may be predetermined. The counter 730 accumulates the determined coefficient quantity.

Figure 8:
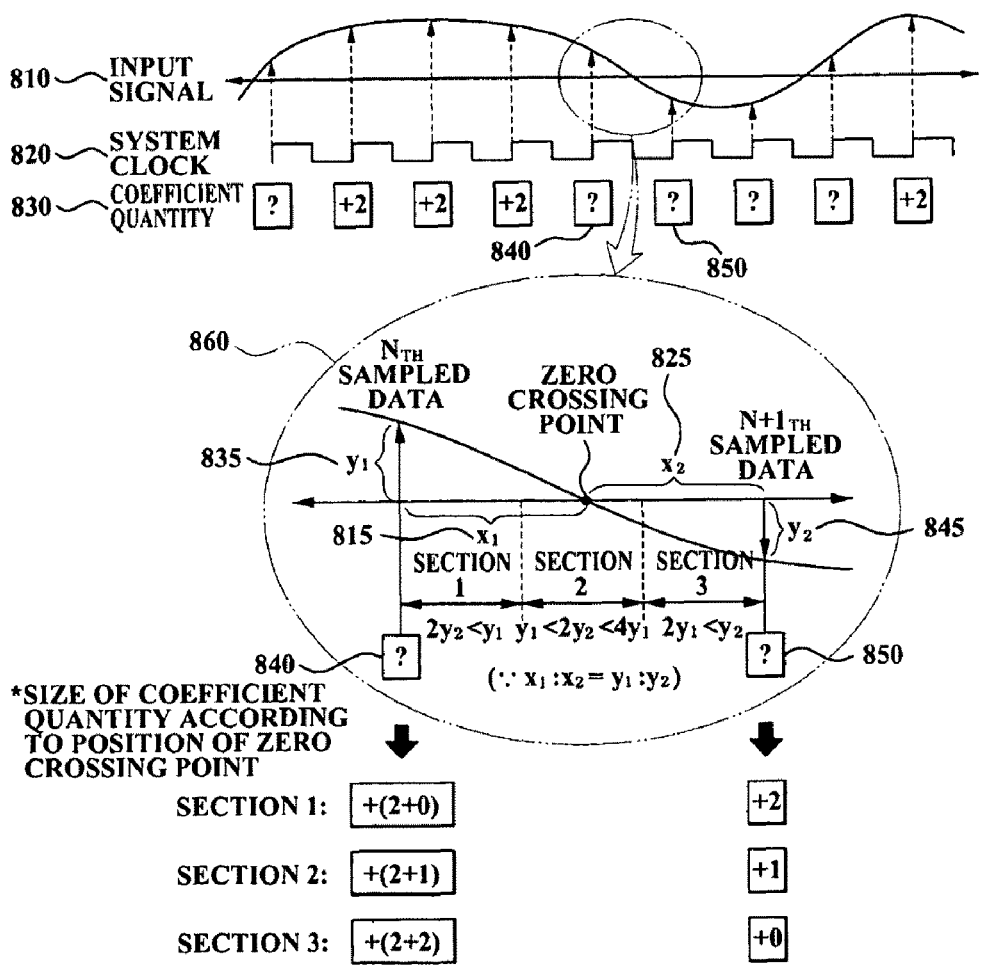
FIG. 8 is a graph illustrating a method of detecting an asymmetry signal of a two times resolution input signal by a zero crossing section detector according to another exemplary embodiment of the present invention.

FIG. 8 is a graph illustrating a method of detecting an asymmetry signal of a two times resolution input signal by a zero crossing section detector according to another exemplary embodiment of the present invention.

In FIG. 8, a length of an arrow represents a size of an input signal 810 which is converted to analog-to-digital (A/D) according to a system clock 820. In the case of a two times resolution, an increment of the counter is fixed as '+2' in a section where a sign of the input signal 810 does not change and remains unchanged. The increment of the counter may be differently determined according to a condition in a section where the sign of the input signal 810 changes.

In FIG. 8, in a part where a counter increase 830 is indicated, a part where the sign of the input signal 810 changes is indicated as '?'. Also, a part of the counter increase 830 which are differently determined according to the condition are illustrated in detail in FIG. 8 (see exploded second graph 860, discussed in more detail below). An asymmetry compensator of the present invention includes an algorithm and, in an exemplary embodiment, a method of determining the value which is indicated as '?'. Values of $y_1$ 835 and $y_2$ 845 in FIG. 8 may already be known through the A/D converter. Accordingly, a proportion of $x_1$ 815 and $x_2$ 825 may be calculated. A relationship among $y_1$ 835, $y_2$ 845, $x_1$ 815 and $x_2$ 825 may easily be calculated, since two right-angled triangles which are centered around the zero crossing point are similar. Namely, a relationship of $x_1$ 815:$x_2$ 825=$y_1$ 835:$y_2$ 845 may be established.

An entire domain may be divided into three respective sections having same length through the proportion of $x_1$ 815 and $x_2$ 825. After finding out information about in which section the zero crossing point is located through the proportion of $y_1$ 835 and $y_2$ 845, the increment of the counter, which is indicated as '?' by the method illustrated in a second graph 860 of FIG. 8 according to the section where the zero crossing point is located is determined.

In this instance, when the section where the zero crossing point is located is a first section from a sample signal before the zero crossing point, a value of the coefficient quantity in a left '?' 840 is +2. Namely, when a number of the section indicated as n and an order of the section where the zero crossing point is located is indicated as k, the size of the coefficient quantity in the left '?' 840 becomes n+k−2. In this instance, a sign is the sign of the sample signal where the size of the coefficient quantity is determined.

In FIG. 8, the sign of the left '?' 840 is +. Accordingly, the coefficient quantity is +2. A sum of values which are indicated as, in this example, two '?' 840 and 850, i.e. the sum of sizes of the coefficient quantities, is '+4', and is fixed. Accordingly, a value which is set on the right '?' 850 is 2, which is a result of subtracting '+2' which is a section coefficient quantity from the 4. Namely, when the number of the section is indicated as n, and the order of the section is indicated as k, the value of the coefficient quantity in the right '?' 850 becomes n−k. In this instance, the sign is the sign of the sample signal where the size of the coefficient quantity is determined. In FIG. 8, the sign of the right '?' 850 is −. Accordingly, the coefficient quantity is −2.

When expressing a numerical expression by using the proportion of $y_1$ 835 and $y_2$ 845 of a point where a boundary between the section and the section is defined, a conditional expression which determines the section may be represented as below.

$$\text{section 1: } 2y_2 < y_1 \qquad \text{[Equation 6]}$$

$$\text{section 2: } y_1 \leq 2y_2 \leq 4y_1 \qquad \text{[Equation 7]}$$

$$\text{section 3: } 2y_1 \leq y_2 \qquad \text{[Equation 8]}$$

The conditional expression for each section may be computed based on the relationship of $x_1$ 815:$x_2$ 825=$y_1$ 835:$y_2$ 845.

Figure 9:
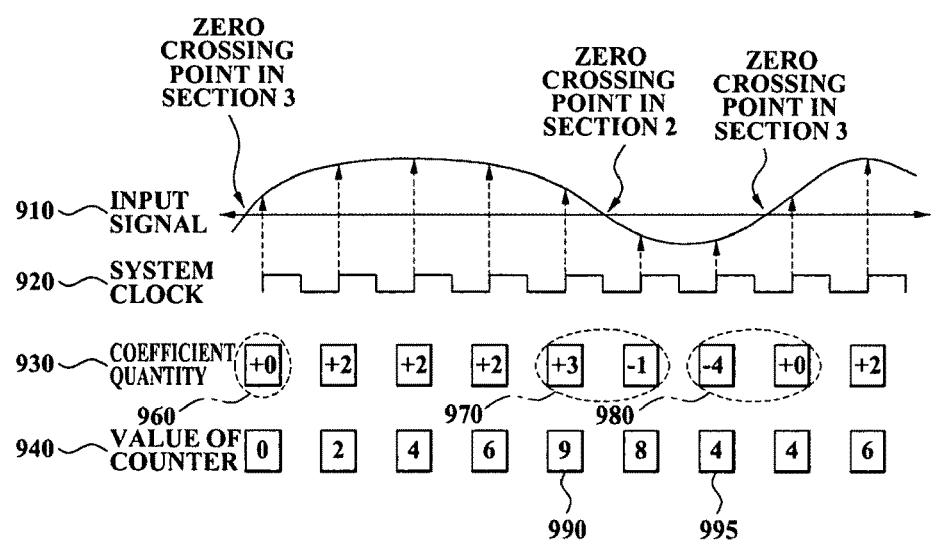
FIG. 9 is a diagram illustrating an exemplary embodiment in a two times resolution input signal by a zero crossing section detector according to another exemplary embodiment of the present invention.

FIG. 9 is a diagram illustrating an exemplary embodiment in a two times resolution input signal by a zero crossing section detector according to another exemplary embodiment of the present invention.

FIG. 9 represents an operation example of the counter of two times resolution input signal. The system clock 920 is shown. The section where a selected zero crossing point is located is indicated on the input signal 910. In this instance, it may be confirmed that coefficients 930 are differently determined according to selected sections 960, 970, 980. As an example, three values which are determined in FIG. 9 are indicated as an oval with dotted lines.

The counter 730 accumulates the determined coefficient every clock cycle. The detected coefficient value is a state of two times resolution. Accordingly, when the detected coefficient value is divided by 2, the coefficient value for each system clock unit may be computed. Namely, in FIG. 9, since the coefficient values which are detected are '9' 990 and '4' 995, when dividing the coefficient values by 2, '4.5' and '2' are computed. Considering '4' and '2' are the coefficient values in a related art digital sum value (DSV) system, the present invention reflects a value to the right of the decimal point in the counter. Accordingly, an asymmetry signal may be detected more accurately.

Figure 10:
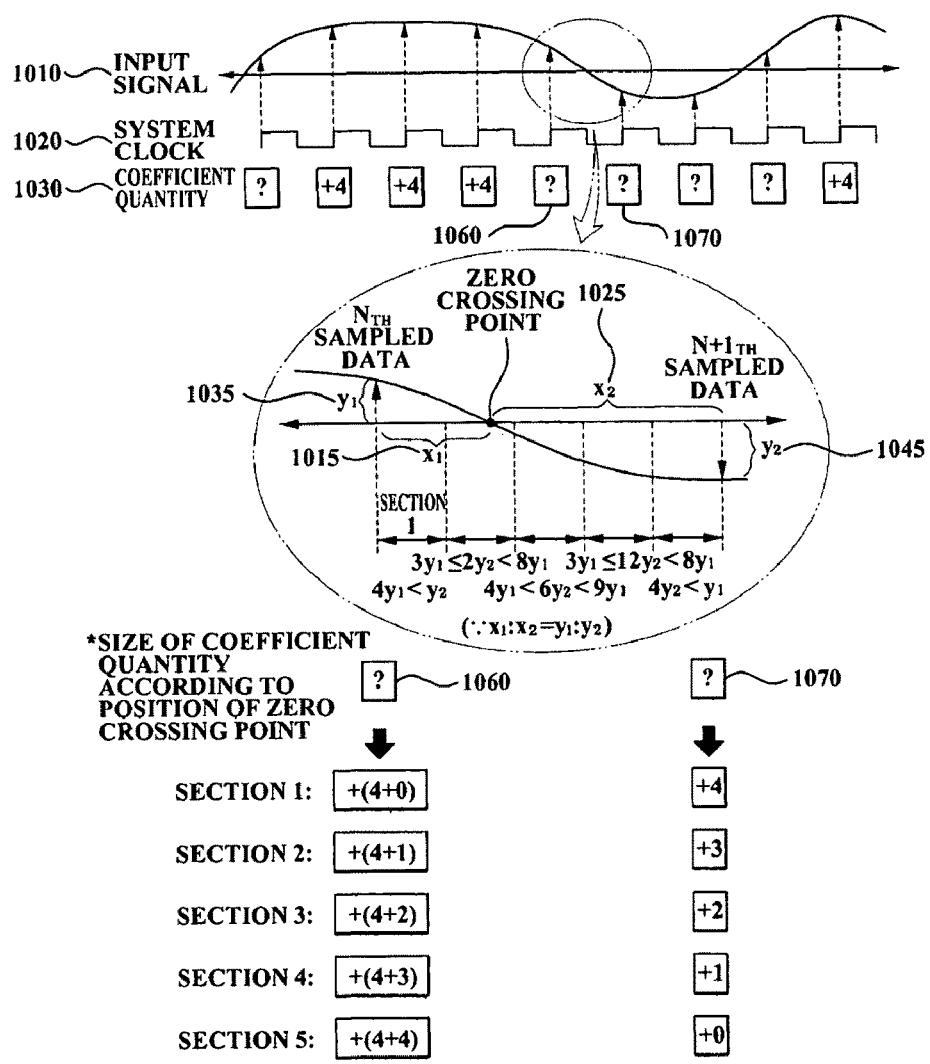
FIG. 10 is a graph illustrating a method of detecting an asymmetry signal of a four times resolution input signal by a zero crossing section detector according to another exemplary embodiment of the present invention.

FIG. 10 is a graph illustrating a method of detecting an asymmetry signal of a four times resolution input signal by a zero crossing section detector according to another exemplary embodiment of the present invention.

An asymmetry signal detecting method described with reference to FIG. 10 is optimized for a four times resolution. A basic principle of the asymmetry signal detection method is the same as a principle which is described in FIG. 8. However, while the section where the zero crossing point is located is divided by 3 in FIG. 8, a section where a zero crossing point is located may be divided by 5 in FIG. 10. Also, while an increase of the counter in a section where the input signal continues in FIG. 8 is '+2', the increase of the counter in the section where the input signal continues in FIG. 10 is '+4'.

When the number of the section is indicated as n and the order of the section is indicated as k, a value of a coefficient quantity in a left '?' 1060 becomes n+k−2. On the other hand, a value of a coefficient quantity in a right '?' 1070 becomes n−k. When expressing a numerical formula by using the proportion of $y_1$ 1035 and $y_2$ 1045 of the point where a boundary between the section and the section is defined, which is in the same way as a case of the two times resolution, a conditional expression which determines the section may be represented as below.

section 1: $4y_1 \leq y_2$ [Equation 9]

section 2: $3y_1 \leq 2y_2 \leq 8y_1$ [Equation 10]

section 3: $4y_1 \leq 4y_2 \leq 9y_1$ [Equation 11]

section 4: $3y_1 \leq 12y_2 \leq 8y_1$ [Equation 12]

section 5: $4y_2 \leq y_1$ [Equation 13]

The conditional expression for each section may be computed based on the relationship of $x_1$ 1015:$x_2$ 1025=$y_1$ 1035:$y_2$ 1045.

Figure 11:
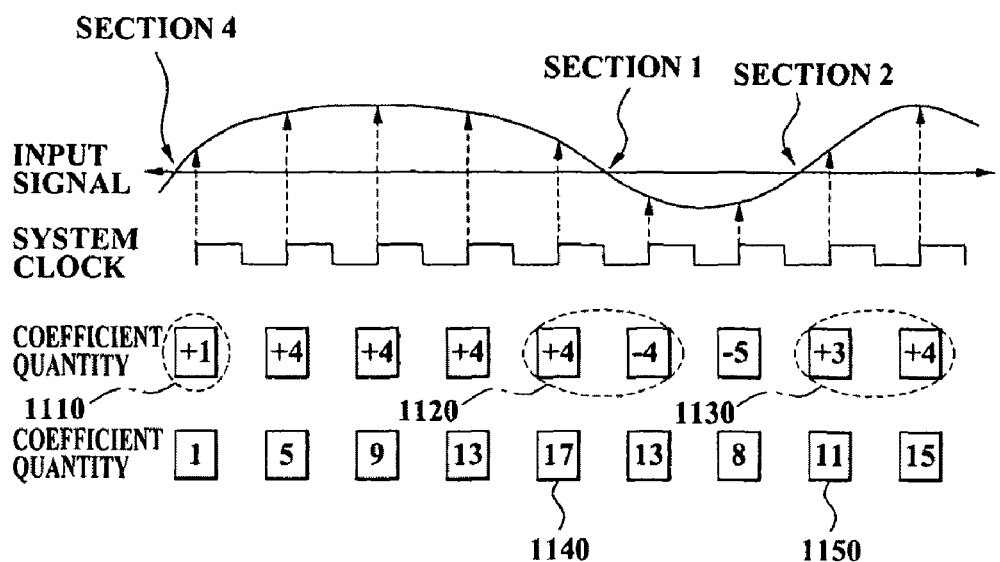
FIG. 11 is a diagram illustrating an exemplary embodiment in a four times resolution input signal by a zero crossing section detector according to another exemplary embodiment of the present invention.

FIG. 11 is a diagram illustrating an exemplary embodiment in a four times resolution input signal by a zero crossing section detector according to another exemplary embodiment of the present invention.

FIG. 11 represents an operation example of the counter of a suggested four times resolution input signal, and a section where a zero crossing point is located is indicated on an input signal. In this instance, it may be confirmed that coefficients are differently determined according to selected sections 1110, 1120, and 1130. In this example, three determined values are indicated as an oval dotted line.

The counter 730 accumulates the coefficient quantity which is determined in the count determinator 720 every clock cycle. In this instance, when an accumulated value is greater than a threshold and a reset signal occurs, a coefficient is initialized with a new value. The threshold may be predetermined. A detected coefficient value is a state of the four times resolution. Accordingly, a coefficient value for each system clock unit may be computed by dividing the detected coefficient value by 4. Namely, since the coefficient values which are detected in FIG. 11 are '17' 1140 and '11' 1150, when dividing the coefficient values by 4, '4.25' and '2.75' are computed. Considering '4' and '2' are the coefficient values in the related art DSV system, the present invention reflects the value to the right of the decimal point in the counter. Accordingly, the asymmetry signal may be detected more accurately.

In this instance, each architecture is identical regardless of a resolution. However, a logic comparison circuit of the zero crossing section detector 700 and a coefficient quantity which is an output value of the count determinator 720 may be differently embodied according to the resolution. Accordingly, without changing the architecture, a cycle detector having even higher resolution may be embodied by a simple change of the logic comparison circuit and the count determinator 720. When the resolution changes, the logic comparison formula changes. The logic comparison formula may be easily computed by expanding a method which is used in an example of the above-mentioned two times resolution and four times resolution. Also, the method which is described with regard to FIG. 7 through FIG. 11 does not need a multiplier. Accordingly, a simple hardware implementation may be easily embodied.

Returning to FIG. 1, a phase locked loop (PLL) 130 estimates a clock of the digital signal and compensates for a frequency error. The PLL 130 includes a frequency detector (not illustrated), which counts and detects a run-length signal from the sampling digital signal during a frequency detection cycle according to a run-length distribution density depending on a channel coding feature. Also, the frequency detector generates frequency errors during the frequency detection cycle through the count value of the run-length signal and a reference value, and compensates the frequency errors of the digital signal. The reference value may be predetermined.

The frequency detector according to an exemplary embodiment of the present invention may be operated in order to detect an accurate frequency of a synchronous pattern having a symmetric feature under an Run Length Limited (RLL)(1, 10) code environment.

Namely, in the RLL(1,10) code environment, under a blueray disc environment for example, the frequency detector may determine that an accurate maximum period (T) is detected from the synchronous pattern and compute a frequency, only when a maximum T with an identical cycle is consecutively outputted twice among the maximum T which is consecutively outputted from a synchronous pattern of the digital signal.

In this case, when calculating a frequency detection, the frequency detector does not use a signal which becomes the maximum T since a signal, i.e. 8T of the input data is corrupted by an inter-symbol interference (ISI), and the maximum T which is more than 9T by 2T of the synchronous pattern. Accordingly, the frequency detector may detect the frequency more accurately.

Generally, the maximum T and the minimum T of the input data in a storage media is determined by the RLL code. At the same time, the maximum T which may not be following a general rule may exist in the synchronous pattern. Namely, the frequency detector may detect the maximum T which exists only in the synchronous pattern and calculate the frequency of the data signal.

As an example, in the RLL(2,10) code environment, under a Digital Versatile Disc (DVD) environment for example, 13T exists in the synchronous pattern. When the frequency detector detects the maximum T during data section including more than one synchronous pattern and the detected maximum T is considered as the 13T, the frequency value of the data signal may be computed. In this instance, the maximum T of data except for the synchronous pattern may be confined to 1T by the RLL(2,10).

On the other hand, the RLL(1,10) code environment, under the blueray environment for example, the maximum T existing in the synchronous pattern has a difference of only 1T. Also, a number of an inter-symbol interference (ISI) existing in blueray signal may be found. In this case, when the same method as the RLL(2,10) code environment is used, since a data signal is damaged by the ISI, an accurate maximum T may not be detected. In the case of the blueray, 9T may not be detected. Accordingly, an accurate frequency and an accurate signal may not be detected.

As described above, these may be overcome by using the symmetric feature of the synchronous pattern through the frequency detector according to an exemplary embodiment of the present invention. Accordingly, when using the PLL 130 including the frequency detector according to the present invention, the accurate frequency may be detected under the RLL(2,10) environment as well as under the blueray disc environment.

The equalizer 150 equalizes a particular frequency of the digital signal. The equalizer 150 according to an exemplary embodiment of the present invention may be embodied as a configuration including an adaptive equalizer and a limit equalizer.

The adaptive equalizer (not shown) may adaptively equalize and compensate a linear amplitude and a phase distortion of digital data which are transmitted from channels which are varied by various factors. The adaptive equalizer includes an error signal generator, an adaptive digital filter, and a coefficient renewer. The adaptive equalizer may make the filtering coefficient adaptive by an adaptation processor including a channel identifier which will be described later. When the equalizer 150 includes the adaptive equalizer, the equalizer 150 may more effectively correspond to a high-density environment such as a 15 GB in a 12 cm diameter disc.

The configuration and the operation of the adaptive equalizer may be embodied to involve those of a related art "Device and method for data reproduction" disclosed in the Korean Patent Publication No. 10-2005-0026320.

A configuration and an operation of the limit equalizer are described in detail with reference to FIG. 12 and FIG. 13.

Figure 12:
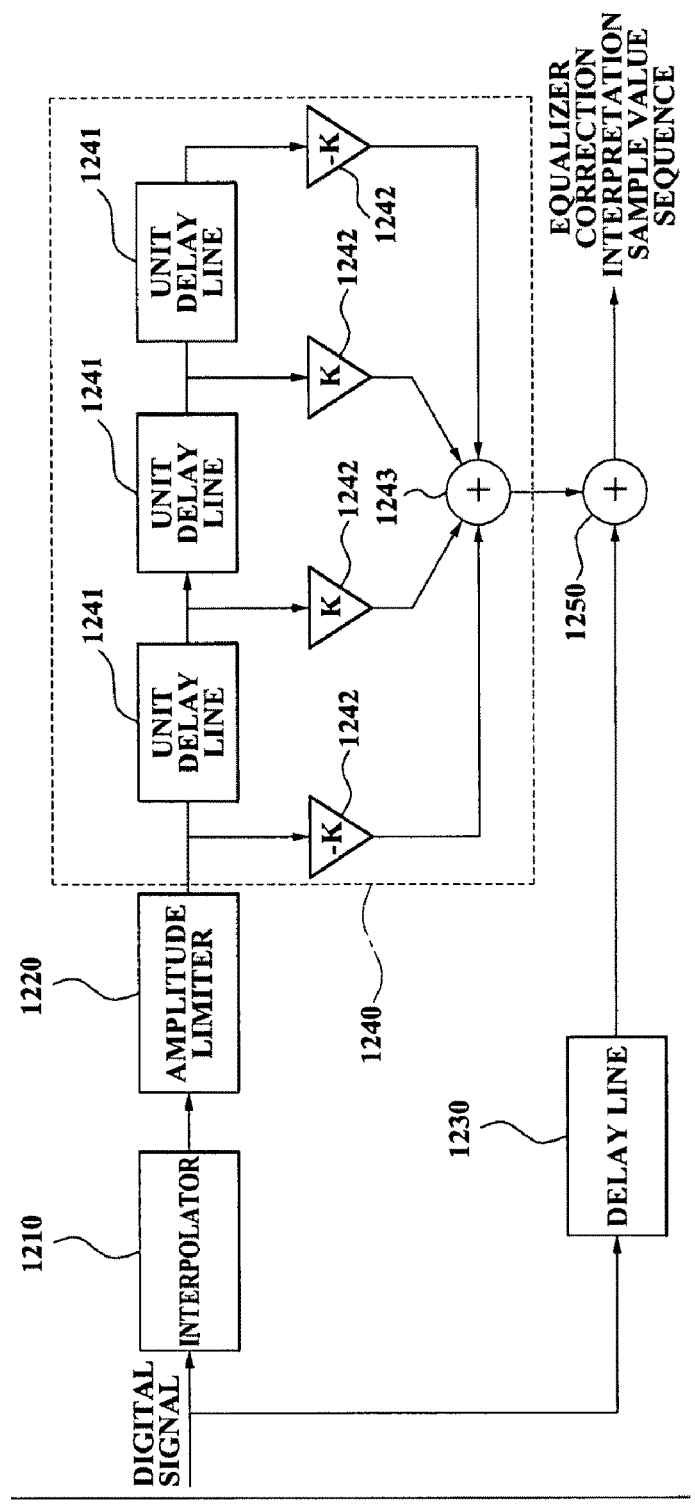
FIG. 12 is a block diagram illustrating an equalizer according to an exemplary embodiment of the present invention.

FIG. 12 is a block diagram illustrating an equalizer according to an exemplary embodiment of the present invention.

The limit equalizer according to an exemplary embodiment of the present invention includes an interpolator 1210, an amplitude limiter 1220, a delay line 1230, a filter 1240, and an adder 1250.

The interpolator 1210 executes an interpolation operation with respect to the digital signal. Namely, the interpolator 1210 generates a sample value sequence by sampling an interpretation signal which is extracted from an optical disc to a middle timing of each clock timing of the channel clock signal. The optical disc may be predetermined. The interpolator 1210 generates an interpolation interpretation sample value sequence RR which is interpolated including the sample value sequence in an interpretation sample value sequence R. Also, the interpolator 1210 transmits the interpolation interpretation sample value sequence RR to the amplitude limiter 1220.

The amplitude limiter 1220 generates an amplitude limit interpretation sample value sequence by limiting the interpolation interpretation sample value sequence to a certain amplitude limit value. The amplitude limit value may be predetermined. Namely, the amplitude limiter 1220 generates the amplitude limit interpretation sample value sequence $R_{LIM}$ by limiting the interpolation interpretation sample value sequence RR to an amplitude limit value +Th and −Th, and then transmits the amplitude limit interpretation sample value sequence $R_{LIM}$ to the filter 1240.

When each interpretation sample value exists within a range of −Th and +Th, which are the amplitude limit value with reference to the interpolation interpretation sample value sequence RR, the amplitude limiter 1220 may output the interpolation interpretation sample value sequence RR to the amplitude limit interpretation sample value sequence $R_{LIM}$ without any changes.

Also, when each interpretation sample value of the interpolation interpretation sample value sequence RR is greater than the amplitude limit value +Th, the amplitude limiter 1220 may output the amplitude limit value +Th to the amplitude limit interpretation sample value sequence $R_{LIM}$.

Also, when each interpretation sample value of the interpolation interpretation sample value sequence RR is less than the amplitude limit value −Th, the amplitude limiter 1220 may output the amplitude limit value −Th to the amplitude limit interpretation sample value sequence $R_{LIM}$.

In this instance, the amplitude limit value +Th and −Th may be set as only the interpolation interpretation sample value sequence RR that corresponds to 2T which is a shortest run-length is included within a range of the amplitude limit. Namely, the amplitude limit value +Th may be set as a value greater than a maximum value in the section that corresponds to the run-length 2T in the interpolation interpretation sample value sequence RR. Also, the amplitude limit value −Th may be set as a value less than a minimum value in the section that corresponds to the run-length 2T in the interpolation interpretation sample value sequence RR.

The filter 1240 includes a plurality of unit delay lines 1241, a plurality of coefficient multipliers 1242, and an adder 1243 that adds all outputs of the plurality of coefficient multipliers 1242.

The unit delay line 1241 delays each inputted value for a period of one clock cycle of the channel clock, and outputs each inputted value.

The coefficient multiplier 1242 may be embodied in order to respectively have a multiplication coefficient −k, k, k, −k. Namely, the filter 1240 may be embodied as a transformer vessel filter whose tap coefficients are −k, k, k, −k. According to the configuration, in the amplitude limit interpretation sample value sequence $R_{LIM}$, the filter 1240 may generate a high band emphasis interpretation sample value sequence which is increased in level only with respect to a sample sequence that corresponds to the run-length 2T.

The delay line 1230 generates a delay interpretation sample value sequence by delaying the interpolation interpretation sample value sequence.

The adder 1250 generates an equalizer compensation interpretation sample value sequence by adding the delay interpretation sample value sequence and an output of the filter. Namely, the adder 1250 adds the high band emphasis interpretation sample value sequence and the interpretation sample value sequence R which is delayed two cycles of the channel clock by the delay line 1230 and supplied. Also, the adder 1250 outputs the result of the addition as the equalizer compensation interpretation sample value sequence RH.

Figure 13:
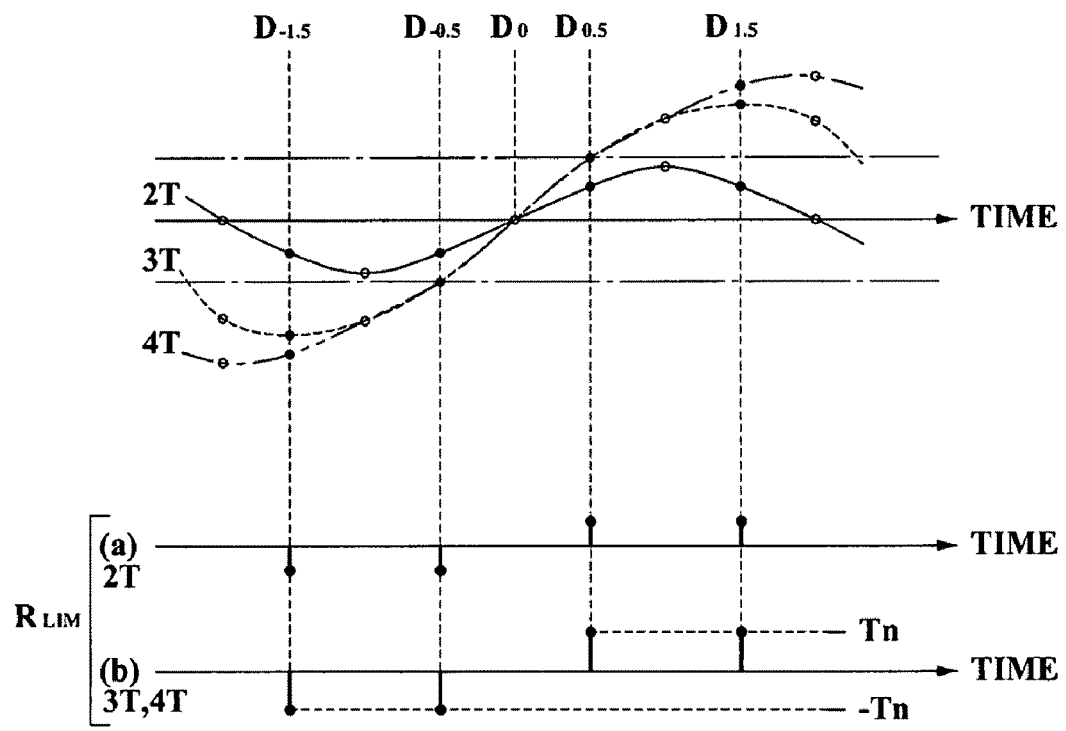
FIG. 13 is a graph illustrating an interpretation sample of an interpretation sample value sequence R and an interpolation interpretation sample of an interpolation interpretation sample value sequence RR according to each case of run-length is 2T, 3T, and 4T according to an exemplary embodiment of the present invention.

FIG. 13 is a graph illustrating an interpretation sample value of an interpretation sample value sequence R, and an interpolation interpretation sample of an interpolation interpretation sample value sequence RR when each case of run-length is 2T, 3T, and 4T according to an exemplary embodiment of the present invention.

In FIG. 13, unfilled circles represent each interpretation sample of the interpretation sample value sequence R. Filled circles represent the interpolation interpretation sample of the interpolation interpretation sample value sequence RR which is generated by the interpolator 1210.

As illustrated in FIG. 13, an amplitude limit value +Th and −Th may be set as only the interpolation interpretation sample value sequence RR that corresponds to 2T which is a shortest run-length is included within range of an amplitude limit. Accordingly, as illustrated in an upper line a of FIG. 13, when the run-length is 2T, the interpolation interpretation sample value sequence RR may be embodied as the amplitude limit interpretation sample value sequence $R_{LIM}$ without any changes.

On the other hand, when the run-length is more than 3T, in a vicinity of $D_0$, which is a zero cross point in time, the interpolation interpretation sample value sequence RR is included within a range of the amplitude limit −Th and +Th. However, excluding the zero crossing point in time, the interpolation interpretation sample value sequence RR is not included within the range of the amplitude limit −Th and +Th. Accordingly, as illustrated in a lower line b of FIG. 13, when the run-length is more than 3T, not in the vicinity of $D_0$, which is a zero cross point in time, the amplitude limit interpretation sample value sequence $R_{LIM}$, which is fixed at the amplitude limit −Th and +Th, may be supplied to the filter 1240.

Accordingly, in the amplitude limit interpretation sample value sequence $R_{LIM}$, the filter 1240 computes the equalizer compensation interpretation sample value sequence to $D_0$, which is a zero cross point in time, based on the amplitude limit interpretation sample value to each of $D_{−1.5}$, $D_{−0.5}$, $D_{0.5}$, and $D_{1.5}$.

Namely, when the equalizer compensation interpretation sample value to $D_0$, which is a zero cross point in time, is indicated as $Z_0$, $Z_0 = (−k)$ $Y_{−1.5} + k$ $Y_{−0.5} + k$ $Y_{0.5} + k$ $Y_{1.5}$ where, in the amplitude limit interpretation sample value sequence $R_{LIM}$, the $Y_{−1.5}$ denotes the amplitude limit interpretation sample value to $D_{−1.5}$, the $Y_{−0.5}$ denotes the amplitude limit interpretation sample value to $D_{−0.5}$, the $Y_{0.5}$ denotes the amplitude limit interpretation sample value to $D_{0.5}$, and the $Y_{1.5}$ denotes the amplitude limit interpretation sample value to $D_{1.5}$.

In this instance, the amplitude limit interpretation sample value to each $D_{−1.5}$ and $D_{−0.5}$ or $D_{0.5}$ and $D_{1.5}$ which corresponds to run-length 2T is set almost identically. Also, when the run length is more than 3T, the amplitude limit interpretation sample value to each $D_{−1.5}$ and $D_{−0.5}$, or $D_{0.5}$ and $D_{1.5}$, is fixed at the amplitude limit −Th or +Th, and thus identically set.

Accordingly, although a value of a tap coefficient k of the filter is set to be large in order to emphasize the high band, a value of the equalizer compensation interpretation sample value sequence RH to $D_0$, which is a zero cross point in time, maintains a certain value. Accordingly, an increase in interference among signs does not occur.

As described hereinbefore, the equalizer according to an exemplary embodiment of the present invention interpolates the interpretation sample value sequence R in the middle timing of the channel clock signal and generates the interpolation interpretation sample value sequence RR. Then, the equalizer executes an amplitude control processing with respect to the interpolation interpretation sample value sequence RR and generates the amplitude limit interpretation sample value sequence $R_{LIM}$. Also, through the filter, the equalizer adds differences among the amplitude limit interpretation sample value to each of four consecutive points in time among the amplitude limit interpretation sample value sequence $R_{LIM}$ through the coefficient multiplier. In this instance, the equalizer delays the interpretation sample value sequence R two clock cycles of the channel clock, and obtains and adds the interpretation sample value that corresponds to a middle point in time of the four points in time. Accordingly, the equalizer may generate the equalizer compensation interpretation sample value sequence RH.

A number of the amplitude limit interpretation sample value may be 4 as described above. Also, the number of the amplitude limit interpretation sample value may be an even number greater than two by suitably varying the number of the amplitude limit interpretation sample values according to a characteristic of the filter at which is aiming. In this instance, with an assumption that the number of the amplitude limit interpretation sample values is N, when delaying the interpretation sample value sequence R for a period of N/2 times of the channel clock signal at a delay device the clock cycle, the interpretation sample value that corresponds to the middle point in time of N pieces of the amplitude limit interpretation sample values may be computed.

The configuration and the operation of the limit equalizer which are described by referring to FIGS. 12 and 13 may be embodied to involve those of related art "waveform equalizer" disclosed in the Japan Patent Publication No. 2001-195832.

Returning to FIG. 1, the binary module 140 includes the Viterbi decoder 141, the slicer 142, and the minimum T compensator 143.

The Viterbi decoder 141 detects binary data from the digital signal. A partial response (PR) type of the Viterbi decoder 141 may be established to PR (a, b, c, d, e).

The slicer 142 decides the binary data depending on a threshold value. The threshold value may be predetermined. To detect the binary data from the digital signal, the slicer 142 computes a slicing level signal by integrating an average of the digital signal, and the Viterbi decoder 141 compares the slicing level signal with the digital signal. Furthermore, the slicer 142 may detect the binary data directly from output of the equalizer 150 to the slicing level signal. The Viterbi decoder 141 as well may detect the binary data from the output of the equalizer 150.

That is, each component of the binary module 140 may become an independent data detector capable of detecting the binary data by itself. The speed of detecting the binary data from an input in the binary module is faster in order of the slicer 142, the minimum T compensator 143, and the Viterbi decoder 141. However, the efficiency of detecting the binary data follows the inverse order to the above.

The aforesaid binary module 140 may be embodied to involve a binary operation of a related art Viterbi decoder disclosed in the Korean Patent Publication No. 2005-0026320 entitled "Device and method for data reproduction".

When the digital signal has a smaller cycle than a unit cycle of the minimum signal corresponding to a code of the optical disc, the minimum T compensator 143 compensates the digital signal with the minimum signal having the unit cycle.

Specifically, if the unit cycle T of the minimum signal is 2T, the minimum T compensator 143 may remove a 1 T digital signal by controlling a path of the 1T digital signal through a switch. Furthermore, if the unit cycle T of the minimum signal is 3T, the minimum T compensator 143 may remove both a 1T digital signal and a 2T digital signal by controlling their paths through the switch.

The minimum T compensator 143 may be embodied to involve the configuration and the operation of a related art minimum T compensator disclosed in the Korean Patent Publication No. 2004-0110090 entitled "Apparatus and method for detecting binary data".

The channel identifier 160 detects the reference level based on the input signal of the equalizer 150. Namely, the channel identifier 160 detects the reference level based on the input signal of the equalizer inputted for a certain time, which may be predetermined, and detects the reference level by computing an average of the input signal of the equalizer and a former reference level value.

Adaptive level error detector (not shown) may include the channel identifier 160. The adaptive level error detector detects the reference level of the Viterbi decoder 141 from both the input signal into the equalizer 150 and the output signal from the Viterbi decoder 141. The adaptive level error detector computes the filtering coefficient of the equalizer 150 from the reference level, the input signal of the equalizer, and the output signal of the equalizer.

The adaptive level error detector may include the channel identifier 160 and an adaptive processor (not shown). The channel identifier detects the base level of the Viterbi decoder 141 from both the input signal into the equalizer 150 and the output signal from the Viterbi decoder 141. The adaptive processor computes the filtering coefficient of the equalizer 150 from the base level, the input signal of the equalizer, and the output signal of the equalizer.

Hereinafter a configuration and an operation of the channel identifier 160 are explained in detail referring to FIGS. 14 to 16.

Figure 14:
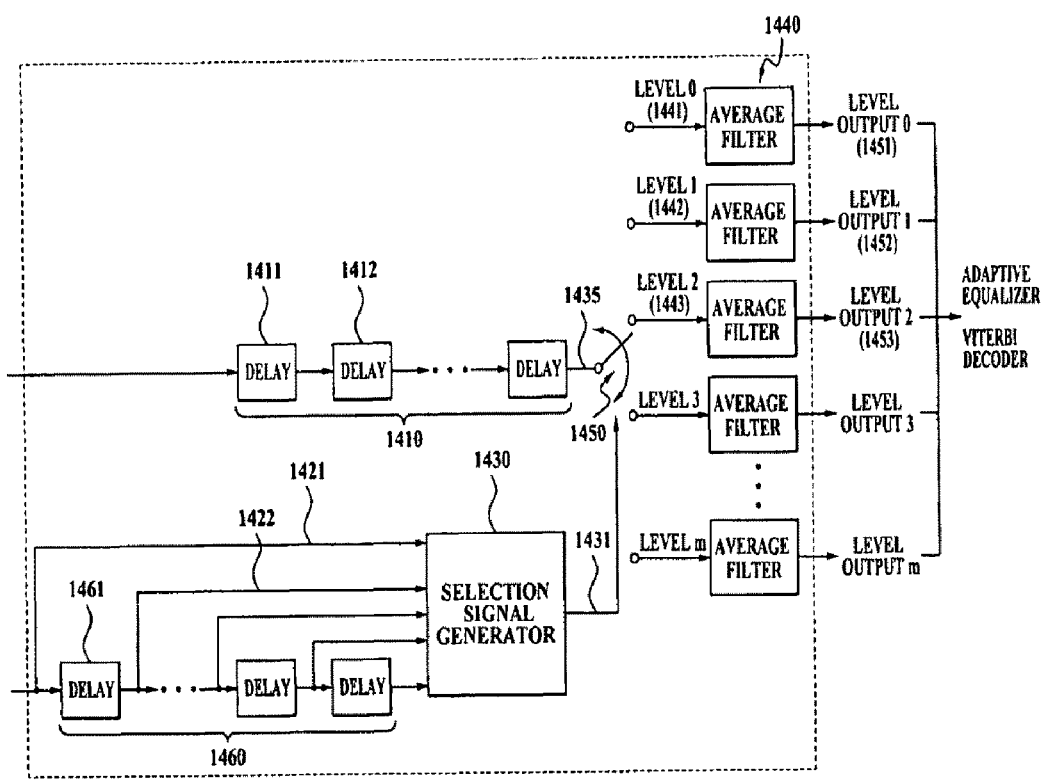
FIG. 14 is a block diagram illustrating a channel identifier according to an exemplary embodiment of the present invention.

FIG. 14 is a block diagram that illustrates a channel identifier of an adaptive level error detector according to an exemplary embodiment of the present invention.

The channel identifier 160 includes a selection signal generator 1430, a level selector 1450, and a plurality of average filters 1440. The selection signal generator 1430 receives the output signal of the Viterbi decoder 141 and then generates a selection signal 1431. Here, the output signal of the Viterbi decoder 141 is a binary signal having "0" or "1" and the final output decoded by the Viterbi decoder 141. By the operation principle of the Viterbi decoder 141, the output signal of the Viterbi decoder 141 has a connection with the input signal thereof, namely, the output signal of the equalizer 150. Thus, the output signal of the Viterbi decoder 141 may specify the kind of levels inputted into the Viterbi decoder 141. Therefore, the input of an adaptive level may be selectively used in the binary module 140 including the Viterbi decoder 141.

For example, when a signal level is generated by a PR(1, 2,1) and a code type is (1,7), possible ideal level values are 4, 2, −2, and −4. If input signal levels are 4, 4, 4, 2, −2, −4, −4, −4, −2, 2, . . . , the output signal of the Viterbi decoder 141 may be 1, 1, 1, −1, −1, −1, −1, −1, 1, 1, . . . . Then, by multiplexing as many as the taps of the Viterbi decoder 141, the output signal of the Viterbi decoder 141 are 111, 11−1, 1−1−1, −1−1−1, . . . , which come to 111, 110, 100, 000, . . . in binary signal.

Thus these binary signals denote that 4, 2, −2, −4, are inputted respectively. After all, 111, 110, 100', 000, . . . may be used as the selection signal specifying the kind of the input levels such as 4, 2, −2, −4, . . . .

The output signal of the Viterbi decoder 141, inputted into the channel identifier, is delayed and split by delays 1460 the number of which is smaller by one than that of taps of the Viterbi decoder and then inputted into the selection signal generator 1430. The delayed input signals 1421, 1422, . . . are merged again by the selection signal generator 1430 and generate the selection signal 1431 in the form of the binary signal. For example, if the number of the taps of the Viterbi decoder 141 is three and if the number of the delays is two, the selection signal 1431 assumes the form of 111, 110, 100, 000, . . . . The output of the Viterbi decoder 141 is not produced immediately at a time, but produced after a computation time corresponding to a defined system clock elapses. The delays 1460 are therefore used because a delay time corresponding to the computation time should be allotted to the input signal of the channel identifier in order to select the input signal corresponding to the output signal of the Viterbi decoder 141.

Additionally, the selection signal 1431 may be removed in case where it conforms to a removable Viterbi path according to conditions of the minimum signal. For example, in case of a three-tap structured Viterbi decoder using a (1,7) code, two selection signals 010 and 101 corresponding to 1T are removed, and six selection signals 000, 001, 011, 100, 110, and 111 are available.

Similarly, a five-tap structured Viterbi decoder using the (1,7) code needs only sixteen levels, and also sixteen selection signals are produced. As for an output of a normal Viterbi decoder 141, an additional separate configuration is not required for a generation of the selection signal 1431 since the output signal itself of the Viterbi decoder 141 is not produced in the form of 1T.

Another input signal of the channel identifier is an input signal of the equalizer 150. The input signal of the equalizer 150 has continuous values and is the target of decoding. This input signal has a real value that is different from the ideal base level. This input signal of the channel identifier passes through delays 1411, 1412, . . . the number of which corresponds to the number of memories of the Viterbi decoder 141 and is then inputted into the level selector 1450. Based on the selection signal 1431, the level selector 1450 transmits the input signal to the respective average filters 1440. Each average filter 1440 corresponds to each level of the Viterbi decoder 141. Therefore, the number of the average filters 1440 may be equal to that of the levels of the Viterbi decoder 141. In this case as well, unnecessary paths may be removed.

The average filter 1440 calculates the average of the selected input signal 1441, 1442, 1443, . . . for a given period and then produces the calculated average as a new level output 1451, 1452, 1453, . . . . Generally the average filter 1440 may use a low pass filter and its property of estimating a DC average value.

An alternative average filter 1440 may be embodied by means of the following equation 1.

$$L'=L+(I-L)/C \quad \text{[Equation 14]}$$

Here, L' denotes a level renewed by a newly entered input signal, and L denotes a former level. In addition, I and C denote a delayed input signal and a constant, respectively. As a constant C is increased, a renewing level L' varies much slightly and therefore a degree of tracking becomes reduced.

The detected new level 1451, 1452, . . . shown in FIG. 14 are inputted into the adaptive processor, which creates a new coefficient of the equalizer 150, being based on level error to be detected. The level error to be detected means a difference between the output signal of the equalizer and a detected level. The new coefficient of the equalizer may be computed by renewing a former coefficient through a least mean square (LMS) method. This is represented in the following equation 2.

$$Wk+1=Wk+2*\mu*ek*Xk \quad \text{[Equation 15]}$$

Here, 'Wk+1', 'Wk', 'µ', 'ek', and 'Xk' mean the new coefficient of the equalizer, the former coefficient of the equalizer, a tracking velocity (a real number), a difference between the output signal of the equalizer and the detected level, and the input signal of the equalizer, respectively.

The input signal Xk of the equalizer 150 is inputted into the adaptive processor after delayed by the delays because a time delay happens while the adaptive processor detects a new level.

The tracking velocity µ is a parameter that determines a degree of tracking, and may be adjustable by a suitable controller. As the tracking velocity µ is higher, a degree of tracking becomes increased.

The adaptive processor forces a channel to be stable. The channel identifier generates an optimum level of the Viterbi decoder 141 on the basis of the input signal of the equalizer 150. Furthermore, the adaptive processor adjusts again the coefficient of the filter by using the optimum level and thereby eliminates noises only while forcing the output signal of the equalizer 150 to nearly maintain the frequency feature of the original channel. This may allow offering much higher stability to a stabilization of coefficients or a divergence issue of the LMS algorithm that has caused problems.

Figure 15:
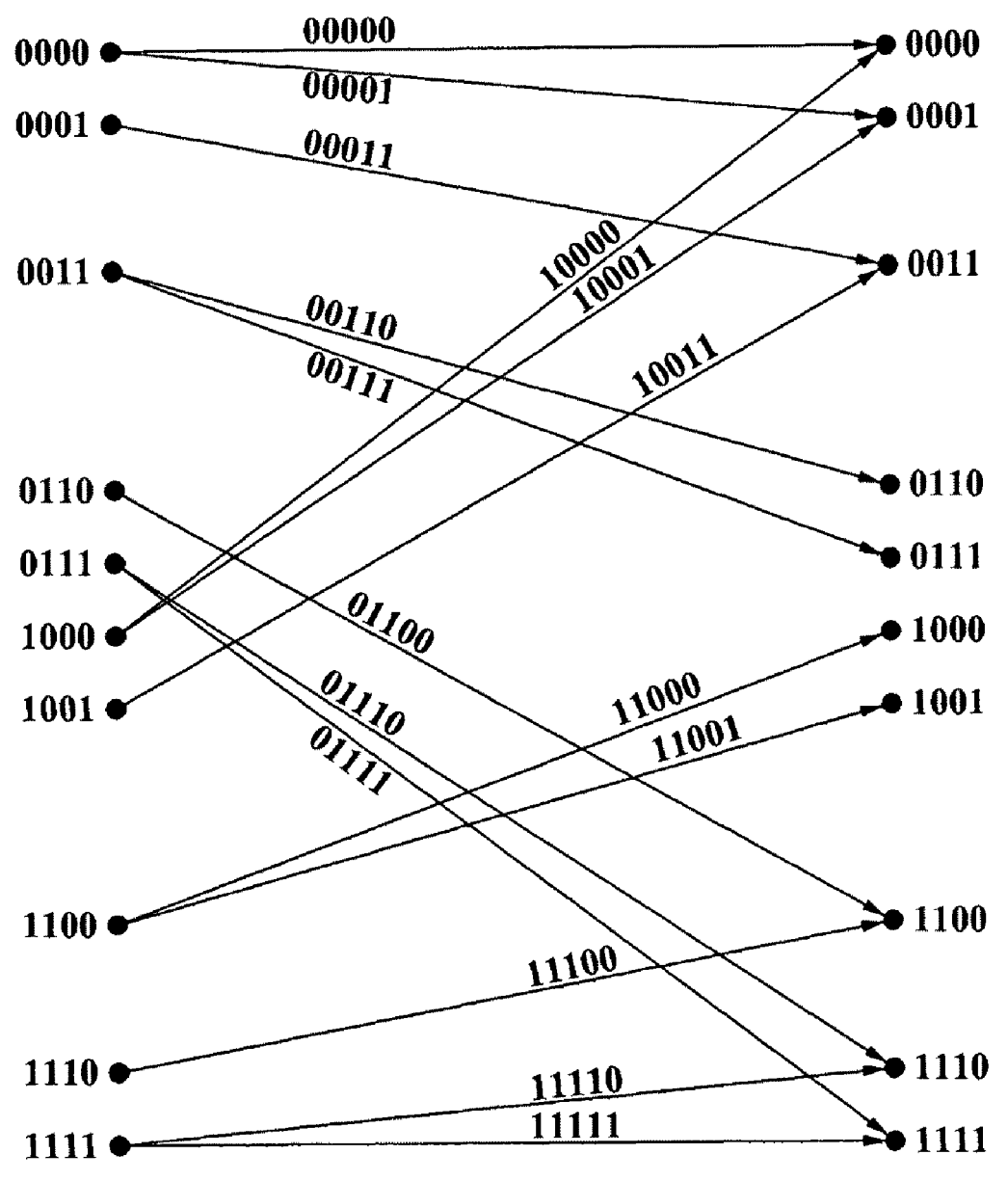
FIG. 15 is a diagram illustrating a trellis diagram of a 5-tap Viterbi decoder of a (1,7) code according to an exemplary embodiment of the present invention.

FIG. 15 is a view that illustrates a trellis diagram of a 5-tap Viterbi decoder of a (1,7) code according to an exemplary embodiment of the present invention.

Referring to FIG. 15, it may be appreciated that paths of the 1T signal are removed. Therefore, the total number of the paths is sixteen, and further, the number of the levels is also sixteen.

Figure 16:
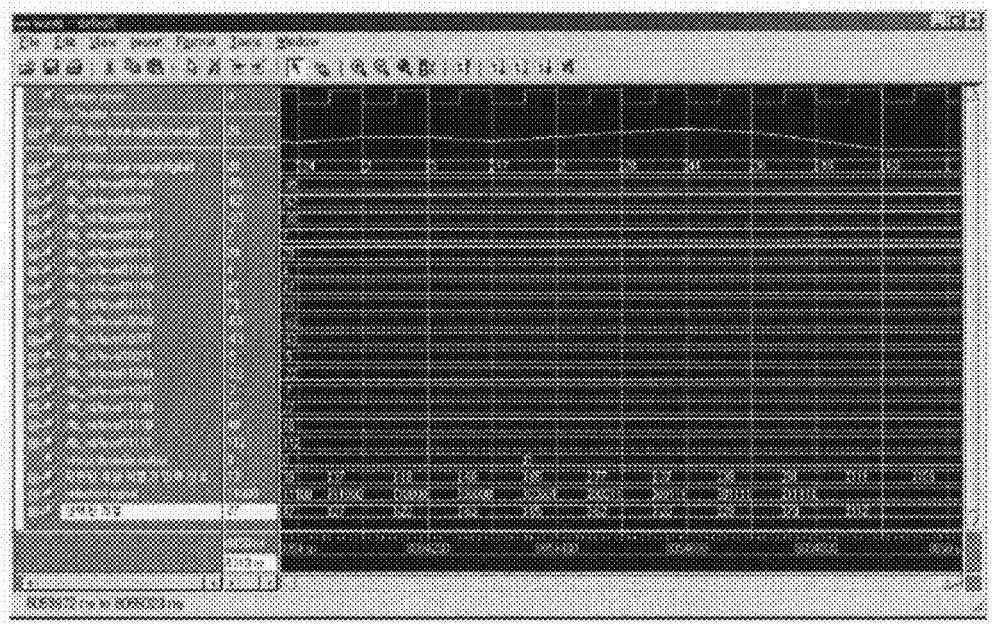
FIG. 16 is a diagram illustrating a level estimation result by the Viterbi decoder in FIG. 15.

FIG. 16 is a view that illustrates a level estimation result by the Viterbi decoder in FIG. 15.

FIG. 16 shows sixteen ideal levels 00000, 00001, 00011, 00110, 00111, . . . . The signals entered into the channel identifier are 39, 37, −18, −68, . . . , and here the selection signals are 11100, 11000, 10000, 00000, 00001, . . . . The number of the selection signals is equal to that of the levels. By selecting the levels being currently computed according to the selection signal, the selected level signals come to 47 (in case of 11100), 27 (in case of 11000), −22 (in case of 10000), −63 (in case of 00000), . . . .

Namely, the selected level signals are quite similar with the input signal. Also, the most ideal level value may be obtained by calculating the average of the delayed input signal of the channel identifier by means of the above equation 1.

Also, a value which is computed as the above through the channel identifier 160 may be inputted to the equalizer 150 and Viterbi decoder 141. In this case, the equalizer 150 may be embodied as an adaptive equalizer.

The channel identifier 160 which is described in FIG. 14 through FIG. 16 may be embodied to involve the configuration and the operation of a related art channel identifier and an adaptive processor disclosed in the Korean Patent Publication No. 2005-0026320 entitled "Device and method for data reproduction".

Returning to FIG. 1, the signal quality measurer 170 includes the jitter controller 171 and the SbER controller 172. The signal quality measurer 170 may measure a jitter or an SbER as quality characteristics of the digital signal from the output signal of both the equalizer and the Viterbi decoder.

The SbER controller 172 of the signal quality measurer 170 computes quality characteristics (i.e., SbER) of the digital signal by adding products of a probability ($C_T$) that a pattern T of the digital signal happens, a probability (erf(0)) that the pattern T is detected corresponding to a pattern F of the digital signal, and a Hamming distance between the pattern T and the pattern F. This is discussed hereinafter referring to FIGS. 17 and 18.

Figure 17:
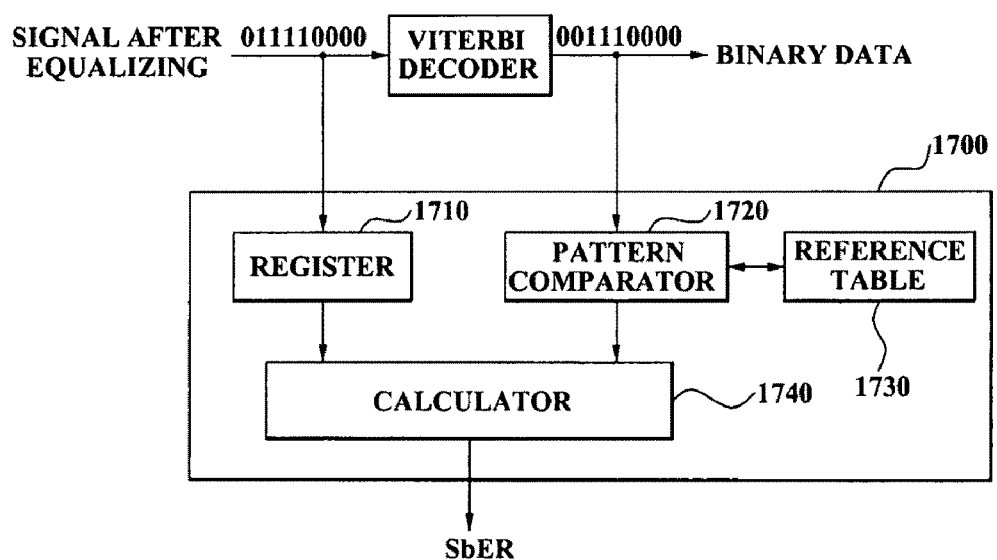
FIG. 17 is a block diagram illustrating a simulated bit error rate (SbER) controller of a signal quality measurer according to an exemplary embodiment of the present invention.

FIG. 17 is a block diagram that illustrates an SbER controller of a signal quality measurer according to an exemplary embodiment of the present invention.

Referring to FIG. 17, the SbER controller 1700 of an exemplary embodiment of the present invention includes a register 1710, a pattern comparator 1720, a reference table 1730, and a calculator 1740.

The equalized input signal is inputted into the Viterbi decoder. Furthermore, the input signal is transmitted to the SbER controller 1700 and recorded into the register 1710.

Binary data outputted from the Viterbi decoder are inputted into the pattern comparator 1720. The pattern comparator 1720 compares patterns of the binary data with the reference table 1730 exemplarily shown in FIG. 18. Thereafter, the calculator 1740 calculates a difference between two Euclidean distances given below (denoted (1) and (2)), computes the Hamming distance ($H_{T,F}$), and computes the SbER using the following equation 16.

(1) Equalized input signal—pattern T in FIG. 18 (right pattern)

(2) Equalized input signal—pattern F in FIG. 18 (erroneous pattern)

$$SbER = \Sigma CT * erf(0) * H_{T,F} \qquad \text{[Equation 16]}$$

CT: A probability that a pattern T of the digital signal happens.

erf(0): A probability that the pattern T is detected corresponding to a pattern F of the digital signal.

$H_{T,F}$: A Hamming distance between the pattern T and the pattern F.

By computing the SbER through the Equation 16, the SbER controller 1700 can measure quality characteristics of the digital signal. The aforesaid SbER controller 1700 may be embodied to involve the configuration and the operation of the related art applications entitled "Apparatus and method of jitter detection" disclosed in the Korean Patent Publication No. 2004-0099951 and those of "Signal quality evaluation method, information recording and reproducing system, recording compensation method, and information medium" disclosed in the Japanese Patent Publication No. 2003-151219.

The jitter controller 171 detects a jitter between the digital signal and the defined system clock. Furthermore, the jitter controller 171 outputs an enable signal when the cycle of the digital signal satisfies certain conditions, which may be predetermined, and then executes a calculation on the detected jitter according to the enable signal. The calculation may be predetermined. These are described referring to FIGS. 19 to 23.

Figure 19:
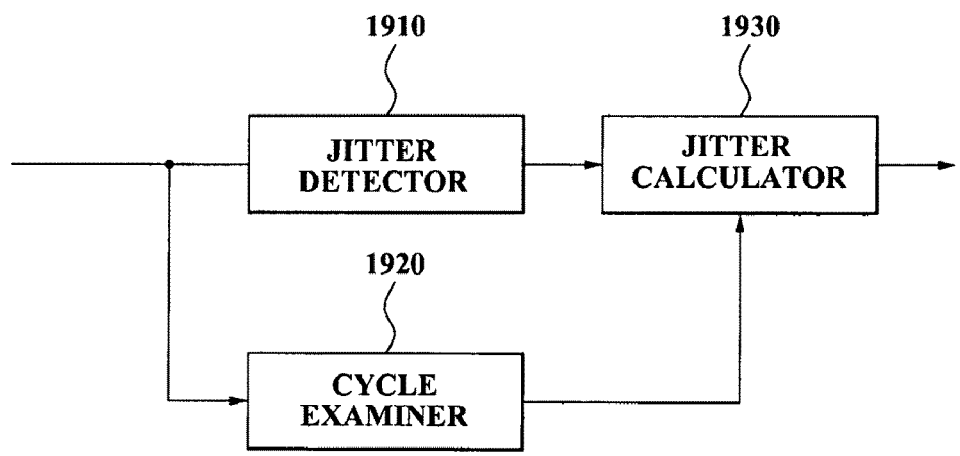
FIG. 19 is a block diagram illustrating a jitter controller according to an exemplary embodiment of the present invention.

FIG. 19 is a view that illustrates a jitter controller according to an exemplary embodiment of the present invention.

Referring to FIG. 19, the jitter controller according to an exemplary embodiment includes a jitter detector 1910, a cycle examiner 1920, and a jitter calculator 1930.

The jitter detector 1910 and the cycle examiner 1920 receive the digital signal, respectively. The jitter detector 1910 detects a difference in time between the system clock outputted from the phase locked loop (130 shown in FIG. 1) and the digital signal. When the digital signal is synchronous with the system clock, a zero crossing point of the digital signal with offset removed coincides with the system clock. However, in actual, there occurs a difference between the zero crossing point and the system clock signal. The jitter detector 1910 computes the above difference in time.

Since a jitter can be detected only when a sign of the input signal shifts, an additional control signal representing a sign shift may be also outputted. Namely, sometimes it is advantageous to have a control signal that shows whether the jitter is in a plus direction or a minus direction.

The cycle examiner 1920 finds a cycle by measuring a time length from a former sign's shift to a new sign's shift when the sign of the input signal shifts. Also the cycle examiner 1920 outputs an enable signal when the cycle satisfies a defined condition. A general example of the defined condition is 'a case where the cycle is more than a fixed cycle'. In the above case, the enable signal is outputted only when the cycle of the input signal exceeds the fixed cycle so that a jitter calculation is executed only in that case.

Another example of the defined condition is to output the enable signal only when the cycle of the input signal is equal to a predetermined value. Additionally, in alternative examples, the enable signal may be outputted only when the cycle of the input signals is not equal to, more than, or not more than a certain value, or between certain values. The certain value or certain values may be predetermined.

The jitter calculator 1930 executes a jitter calculation only when the cycle examiner 1920 satisfies a certain condition, which may be predetermined, by using a jitter value outputted from the jitter detector 1910 and the output signal of the cycle examiner 1920. That is, the jitter calculation is not always executed whenever the jitter happens.

Figure 20:
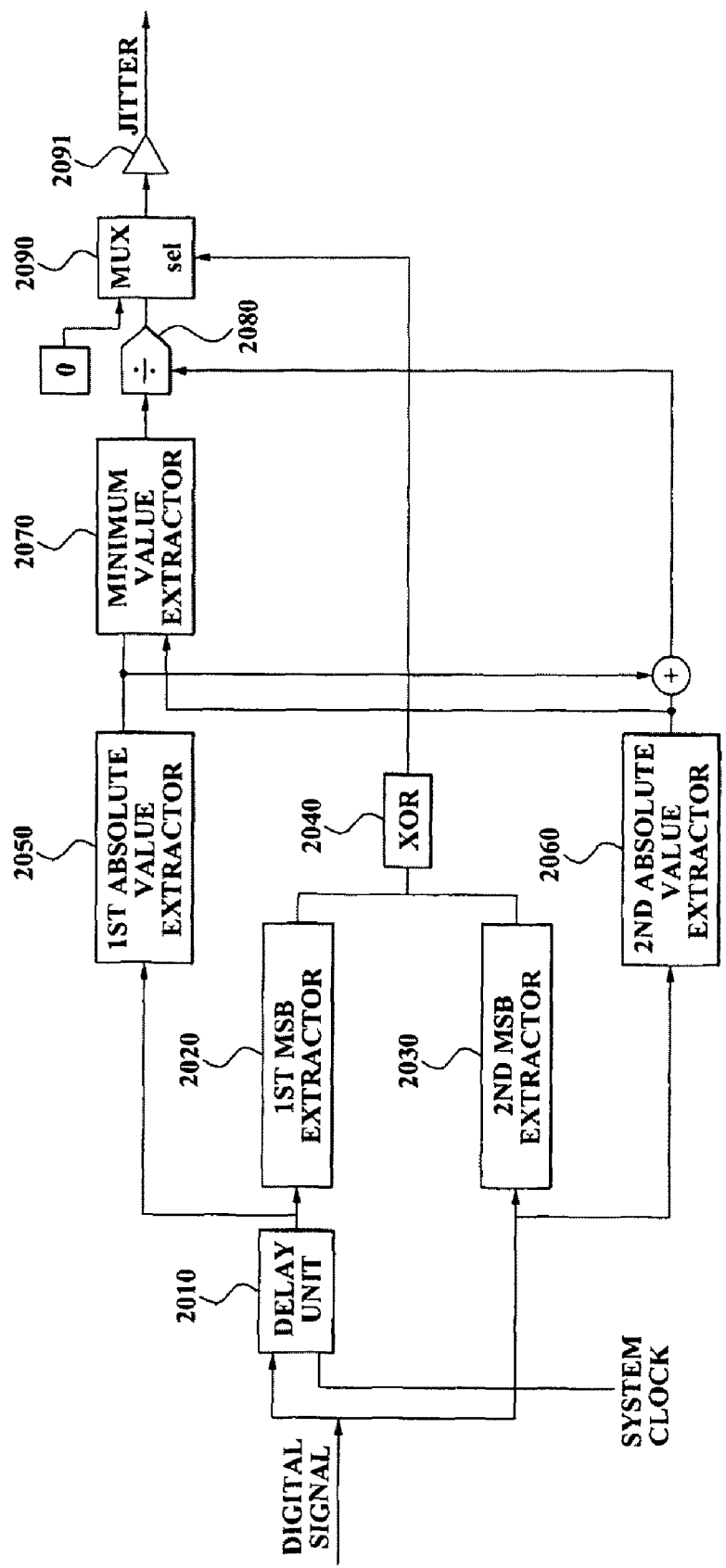
FIG. 20 is a block diagram illustrating a jitter detector of the jitter controller according to an exemplary embodiment of the present invention.

FIG. 20 is a view that illustrates a jitter detector of the jitter controller according to an exemplary embodiment of the present invention.

Referring to FIGS. 19 and 20, the jitter detector 1910 may be embodied by analog techniques or digital techniques, but to simplify the explanation, an example of digital techniques are described below.

In the jitter detector 1910 using digital techniques, the input signal from which the offset is removed is inputted in the form of quantized digital data. Since the jitter is produced when the sign of the input signal shifts, the jitter detector 1910 may examine in advance whether the sign of the input signal shifts or not.

Specifically, one of the digital signals is delayed by one system clock through a delay unit 2010 and the other is not delayed. A first most significant bit (MSB) extractor 2020 and a second most significant bit (MSB) extractor 2030 detect most significant bits (MSBs) respectively from the delayed signal and the non-delayed signal. Since a sign shift causes a variation of the MSB, an XOR gate 2040 receiving the detected MSBs outputs "1" when the sign shift happens. Namely, an output without the sign shift is "0" and an output with the sign shift is "1". So this signal may become a sign detection signal.

A method of computing the jitter is as follows. A first absolute value extractor 2050 and a second absolute value extractor 2060 receive the delayed signal and the non-delayed signal, respectively, and output their absolute values to a minimum value extractor 2070. The minimum value extractor 2070 selects and outputs a relatively smaller absolute value of the first absolute value and the second absolute value. A divider 2080 divides the selected output signal by an added value of the absolute values of two input signals. Then an output value from the divider 2080 is inputted into an MUX 2090. The MUX 2090 that normally outputs "0" selects the output signal of the divider 2080 when the sign shift happens. The MUX 2090 may multiply the output signal of the divider 2080 by a certain value, which may be predetermined.

Figure 21:
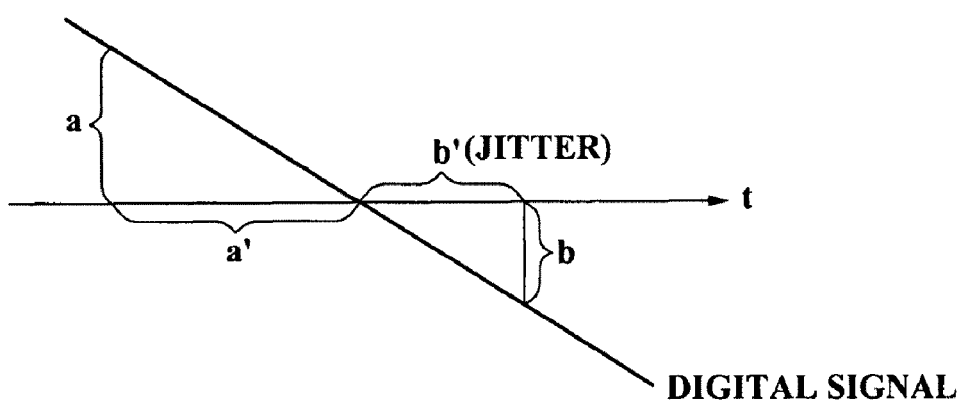
FIG. 21 is a diagram illustrating a calculation method of a jitter value according to an exemplary embodiment of the present invention.

FIG. 21 is a view that illustrates a calculation method of a jitter value according to an exemplary embodiment of the present invention.

Referring to FIG. 21, referential characters "a" and "b" denote values obtained by sampling the analog signal. The sum of referential characters "a'" and "b'" is fixed as the system clock. The jitter means a difference on a time axis between the clock signal and the input signal, and may be represented by a time difference between the zero crossing point of the input signal and the system clock.

Since a value of "b'" denote a time difference between the system clock and the input signal, it may be jitter value. Supposing that a signal is linear around the zero crossing point, a relationship expression "a:a'=b:b'" is obtained. Here, since a, b, and a'+b' (i.e., system clock) are already known values, the above expression can be rewritten as b'=b×(system clock)/(a+b). This calculation may be executed through the jitter detector shown in FIG. 20. As given above, the jitter value may be calculated by putting a smaller absolute data between two zero crossing points into a numerator and further putting an added value of two absolute values into a denominator.

Figure 22:
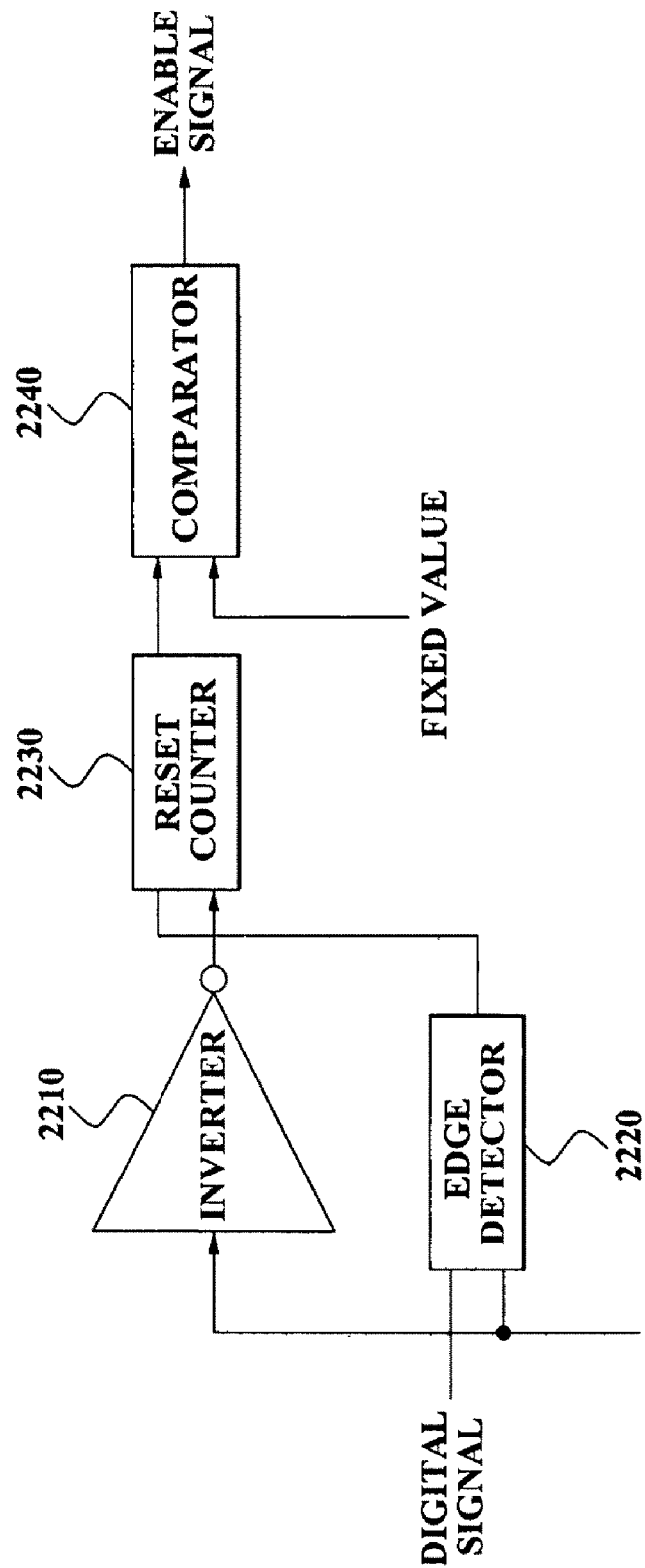
FIG. 22 is a block diagram illustrating a cycle examiner of the jitter controller according to an exemplary embodiment of the present invention.

FIG. 22 is a view that illustrates a cycle examiner of the jitter controller according to an exemplary embodiment of the present invention.

Referring to FIG. 22, the cycle examiner of an exemplary embodiment includes an inverter 2210, an edge detector 2220, a reset counter 2230, and a comparator 2240.

The edge detector 2220 judges whether the input signal passes the zero point when the input signal is entered. As discussed above, the edge detector 2220 may detect the MSBs from both the delayed signal and the non-delayed signal, and outputs after an XOR operation of the detected MSBs. A value "1" is outputted at an edge point where the sign shift happens. When an edge is detected, the edge detector 2220 sends the counter 2230 a signal showing that the edge is detected.

The counter 2230 adds a count value whenever the system clock is entered. This clock may be an inversed clock passing through the inverter 2210.

Figure 23:
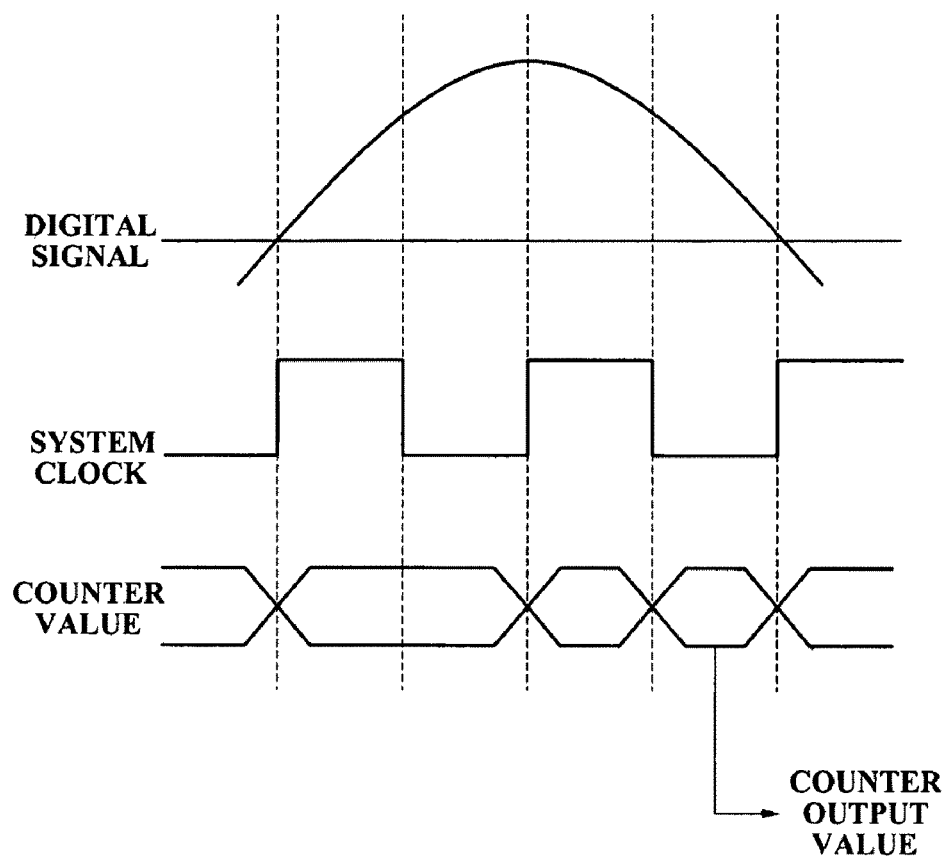
FIG. 23 is a diagram illustrating a timing diagram of a counter of the cycle examiner according to an exemplary embodiment of the present invention.

FIG. 23 is a view that illustrates a timing diagram of a counter of the cycle examiner according to an exemplary embodiment of the present invention.

Referring to FIGS. 22 and 23, when an edge detection signal is entered, the counter 2230 is reset to "0". And a value just before reset is inputted into the comparator 2240. The comparator 2240 outputs an enable signal by comparing an output value of the counter 2230 with a fixed value. A micro controller or other external controller may change the fixed value in advance.

The enable signal, i.e., the output signal of the comparator 2240, may be used as an approval signal that decides whether to use the output of the cycle examiner or not. The comparator 2240 may be configured in a variety of forms. For example, the comparator 2240 may be configured to output the enable signal when a signal having a smaller cycle than a specific cycle is detected, when a signal having a greater cycle than a specific cycle is detected, when a signal having a specific cycle is detected, when a signal having a specific cycle is not detected, or when the cycle of a detected signal is between specific values. A micro controller or other external controller may regulate these cases.

Specifically, in case of input signals with 3T to 11T, the enable signal may be outputted when cycles with 3T to 11T are detected. In case of input signals with 3T to 11T and 14T, the enable signal may be outputted when cycles with 3T to 11T and 14T are detected. In case of input signals with 2T to 9T, the enable signal may be outputted when cycles with 2T to 9T are detected.

Furthermore, in case of input signals with 3T to 11T, the enable signal may be outputted when cycles with 4T to 11T are detected. In case of input signals with 3T to 11T and 14T, the enable signal may be outputted when cycles with 4T to 11T and 14T are detected. In case of input signals with 2T to 9T, the enable signal may be outputted when cycles with 3T to 9T are detected.

Additionally, in case of input signals with 3T to 11T, the enable signal may be outputted when cycles more than 3T are detected. In case of input signals with 3T to 11T and 14T, the enable signal may be outputted when cycles more than 3T are detected. In case of input signals with 2T to 9T, the enable signal may be outputted when cycles more than 2T are detected.

Additionally, in case of input signals with 3T to 11T, the enable signal may be outputted when cycles more than 4T are detected. In case of input signals with 3T to 11T and 14T, the enable signal may be outputted when cycles more than 4T are detected. In case of input signals with 2T to 9T, the enable signal may be outputted when cycles more than 3T are detected.

Returning to FIG. 19, the jitter calculator 1930 receives the detected jitter value and the approval signal of the cycle examiner 1920 and then executes a calculation of a real jitter value. And the jitter calculator 1930 outputs an average of the jitters in specific cycles when certain conditions are satisfied. The conditions may be predetermined. The cycle examiner 1920 may establish these conditions. Generally the real jitter value is an average of jitter values obtained within specific cycles, and computed by a micro controller or any other arithmetic hardware under particular conditions that a system designer requires. 'To output an average jitter value when a signal more than 4T happens n times' is an example of such conditions. Generally possible conditions are as follows.

(1) To output an average jitter value when a specific T happens N times.
(2) To output an average jitter value when a cycle more than a specific T happens N times.
(3) To output an average jitter value when a cycle less than a specific T happens N times.
(4) To output an average jitter value when a cycle between T1 and T2 happens N times.
(5) To output an average jitter value when a non-T signal happens N times.
(6) To output an average jitter value for every specific time.

Here, T, T1, T2, N are optionally selectable values by a micro controller or any other controller. Furthermore, the above conditions may be variously established by changing the conditions of the cycle examiner 1920.

The aforesaid jitter controller 171 may be embodied to involve the configuration and the operation of related art "Apparatus and method of jitter detection" disclosed in the Korean Patent Publication No. 2004-0099951.

As fully discussed hereinbefore, the optical disc reproducing apparatus of the present invention is configured with a combination of the asymmetry compensator, the phase locked loop, the binary module, the equalizer, the channel identifier, and the signal quality measurer. A disc reproduction realized by combining featured configurations and operations of the above elements may create a synergy effect.

According to exemplary embodiments of the present invention, an optical disc reproducing apparatus supports various Run Length Limited (RLL) codes such as RLL(2,1), RLL(1,7) and RLL(1,10). Accordingly, the optical disc reproducing apparatus may effectively reproduce data of an optical disc.

Also, according to exemplary embodiments of the present invention, the optical disc reproducing apparatus may detect data more accurately by amplifying a high frequency signal component regardless of an occurrence or an increase of both a noise of a signal and a signal interference, measure a signal quality, and estimate a frequency.

Also, according to exemplary embodiments of the present invention, the optical disc reproducing apparatus may adjust target channel features of both an equalizer and a Viterbi by accurately estimating signal models of both the equalizer and the Viterbi according to each feature of a record reproducing channel.

Also, according to exemplary embodiments of the present invention, the optical disc reproducing apparatus may accurately compensate a minute asymmetry feature of the signal in the record reproducing channel.

Also, according to exemplary embodiments of the present invention, the optical disc reproducing apparatus may accurately estimate a frequency of a synchronous pattern having a symmetric feature.

Also, according to exemplary embodiments of the present invention, the optical disc reproducing apparatus supports various signal patterns including cases that a minimum T is 2 or 3, and may accurately detect a signal by constantly corresponding to a high-speed signal.

Although a few exemplary embodiments of the present invention have been shown and described, the present inventive concept is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An optical disc reproducing apparatus comprising:
an analog-to-digital (A/D) converter which converts an analog signal obtained from an optical disc to a digital signal;
an asymmetry compensator which detects and corrects an offset of the digital signal;
a phase locked loop (PLL) which estimates a clock of the digital signal and compensates for a frequency error;
a binary module which converts the digital signal to binary data;
an equalizer which equalizes a particular frequency of the digital signal; and
a channel identifier which detects a reference level of the binary module, based on an input signal of the equalizer,
wherein the asymmetry compensator comprises:
a zero crossing detector detecting a zero crossing point by comparing each sign of two consecutive sample signals with respect to the digital signal;
a decimal asymmetry detector computing a jitter value necessary for an asymmetric waveform level compensation of the digital signal; and
a count determinator determining a coefficient quantity by using a sign bit of a sample signal according to the zero crossing point, the jitter value, and a predetermined system clock cycle.

2. The apparatus of claim 1, wherein the decimal asymmetry detector computes the jitter value by dividing a system clock by a value which is obtained by multiplying a greater value and a smaller value of a size of the sample signals with respect to the zero crossing point, and multiplying a result of the division and the smaller value.

3. The apparatus of claim 1, wherein the count determinator computes the coefficient quantity by multiplying an offset to a right of a decimal point and −2, when the zero crossing point exists among the sample signals, the size of the sample signal before the zero crossing point is greater among the sample signals, and the sign of the sample signal after the zero crossing point is negative.

4. The apparatus of claim 1, wherein the count determinator computes the coefficient quantity by multiplying an offset to a right of a decimal point and 2, when the zero crossing point exists among the sample signals, the size of the sample signal before the zero crossing point is greater among the sample signals, and the sign of the sample signal after the zero crossing point is positive.

5. The apparatus of claim 1, wherein the count determinator computes the coefficient quantity by adding −2 and a value which is obtained by multiplying an offset to a right of a decimal point and 2, when the zero crossing point exists among the sample signals, the size of the sample signal after the zero crossing point is greater among the sample signals, and the sign of the sample signal after the zero crossing point is negative.

6. The apparatus of claim 1, wherein the count determinator computes the coefficient quantity by adding 2 and a value which is obtained by multiplying an offset to a right of a decimal point and −2, when the zero crossing point exists among the sample signals, the size of the sample signal after the zero crossing point is greater among the sample signals, and the sign of the sample signal after the zero crossing point is positive.

7. The apparatus of claim 1, wherein the count determinator computes the coefficient quantity as −1, when the zero crossing point does not exist among the sample signals and the signs of the sample signals around the zero crossing point are all negative.

8. The apparatus of claim 1, wherein the count determinator computes the coefficient quantity as 1, when the zero crossing point does not exist among the sample signals and the signs of the sample signals around the zero crossing point are all positive.

9. The apparatus of claim 1, wherein the PLL detects a frequency only when a maximum T with an identical cycle is consecutively outputted twice among the maximum T's which are consecutively outputted from a synchronous pattern of the digital signal.

10. The apparatus of claim 1, wherein the equalizer comprises:
    an interpolator which generates an interpolation interpretation sample value sequence by sampling the digital signal according to a clock timing of a certain channel clock signal;
    an amplitude limiter which generates an amplitude limit interpretation sample value sequence by limiting the interpolation interpretation sample value sequence by a certain amplitude limit value;
    a filter which outputs a result which is obtained by giving and adding each weight between the amplitude limit interpretation sample value among the amplitude limit interpretation sample value sequence;
    a delay line which generates a delay interpretation sample value sequence by delaying the interpolation interpretation sample value sequence; and
    an adder which generates an equalizer compensation interpretation sample value sequence by adding the delay interpretation sample value sequence and an output of the filter.

11. The apparatus of claim 10, wherein the amplitude limit interpretation sample value sequence is generated to be greater than a maximum value of a signal level in a section having a shortest level inversion interval in the digital signal.

12. The apparatus of claim 11, wherein the shortest level inversion interval has a period of two times one clock cycle in the channel clock signal.

13. The apparatus of claim 10, wherein the interpolator generates the interpolation interpretation sample value sequence by sampling the digital signal according to a clock timing having twice a frequency of the channel clock signal.

14. The apparatus of claim 10, wherein the filter increases a value of a high section component in the amplitude limit interpretation sample value sequence.

15. The apparatus of claim 14, wherein the high section component is a component having a shortest level inversion interval in the amplitude limit interpretation sample value sequence.

16. The apparatus of claim 1, wherein the channel identifier detects the reference level based on the input signal of the equalizer inputted for a certain time, and detects the reference level by computing an average of an input signal of the equalizer and a former reference level value.

17. The apparatus of claim 16, wherein the channel identifier comprises:
    a selection signal generator which generates a selection signal from an output signal of the binary module;
    a level selector which selects a level to be detected from an input signal of the equalizer according to the selection signal; and
    an average filter which generates a new level value with respect to the selected level, based on a former level value and a level value of an input signal inputted as the selected level.

18. The apparatus of claim 17, wherein the selection signal generator generates the selection signal by multiplexing a signal that delays an output signal of the binary module by a same amount as taps of a Viterbi.

19. The apparatus of claim 17, wherein the average filter is a low pass filter.

20. The apparatus of claim 17, wherein the average filter detects the reference level value by subtracting a former level value from the delayed input signal, dividing a result of the subtraction by a constant, and adding the former level value and a result of the division.

21. The apparatus of claim 1, wherein the binary module comprises:
    a minimum T compensator which compensates the digital signal with a minimum T signal having a certain unit cycle;
    a Viterbi decoder which detects the binary data from the digital signal; and
    a slicer which determines the binary data according to a threshold.

22. The apparatus of claim 21, wherein a partial response (PR) type of the Viterbi decoder is PR (a, b, c, d, e).

23. The apparatus of claim 21, wherein the minimum T compensator compensates a digital sampling signal with a minimum signal having the unit cycle when the digital sampling signal has a lower cycle than the unit cycle of the minimum signal corresponding to a code of the optical disc.

24. The apparatus of claim 23, wherein the minimum T compensator controls a path of the 1T digital signal through a switch when the unit cycle T of the minimum signal is 2T, and controls paths of the 2T and 1T digital signals through the switch when the unit cycle T of the minimum signal is 3T.

25. The apparatus of claim 1, further comprising:
    a signal quality measurer which measures a jitter or a simulated bit error rate (SbER) of the digital signal.

26. The apparatus of claim 25, wherein the signal quality measurer includes an SbER controller which computes quality characteristics of the digital signal using output signals of the equalizer.

27. The apparatus of claim 26, wherein the SbER controller computes quality characteristics of the digital signal by adding products of a probability (CT) that a pattern T of the digital signal occurs, a probability (erf(0)) that the pattern T is detected corresponding to a pattern F of the digital signal, and a Hamming distance between the pattern T and the pattern F.

28. The apparatus of claim 26, wherein the signal quality measurer includes a jitter controller which detects a jitter between a system clock and a digital signal, outputs an enable signal when a cycle of the digital signal satisfies a defined condition, and executes a calculation to detect jitter according to the enable signal.

29. The apparatus of claim 28, wherein the jitter controller computes the jitter of the digital signal by outputting a delayed input signal, obtained by delaying the digital signal by the system clock, and outputting a sign detection signal indicating a point when a sign of the digital signal shifts.

30. The apparatus of claim 29, wherein the jitter controller detects most significant bits from both the delayed input signal and the digital signal, and outputs the sign detection signal after an XOR operation of the detected most significant bits.

31. The apparatus of claim 29, wherein the jitter controller computes a first absolute value of the digital signal and a second absolute value of the delayed input signal, selects a zero or a value obtained by dividing a smaller absolute value of the first absolute value and the second absolute value by a sum of both absolute values, and outputs a value obtained by multiplying the selected value and a certain value.

* * * * *